(12) United States Patent
Badgery

(10) Patent No.: US 12,296,706 B2
(45) Date of Patent: May 13, 2025

(54) SYSTEMS FOR IDENTIFYING COUPLING BETWEEN VEHICLES AND CHARGE STATIONS

(71) Applicant: Geotab Inc., Oakville (CA)

(72) Inventor: Kip Arthur Millar Badgery, Calgary (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/761,868

(22) Filed: Jul. 2, 2024

(65) Prior Publication Data
US 2025/0115151 A1    Apr. 10, 2025

Related U.S. Application Data

(60) Provisional application No. 63/542,331, filed on Oct. 4, 2023.

(51) Int. Cl.
| | |
|---|---|
| *B60L 53/65* | (2019.01) |
| *B60L 53/16* | (2019.01) |
| *B60L 53/30* | (2019.01) |

(52) U.S. Cl.
CPC ............... *B60L 53/65* (2019.02); *B60L 53/16* (2019.02); *B60L 53/305* (2019.02); *B60L 2240/62* (2013.01)

(58) Field of Classification Search
CPC ........ B60L 53/65; B60L 53/16; B60L 53/305; B60L 2240/62
See application file for complete search history.

(56) References Cited

U.S. PATENT DOCUMENTS

2020/0412160 A1* 12/2020 Manzoor ................. B60L 50/60

FOREIGN PATENT DOCUMENTS

DE         102009028968 A1 * 3/2011 .......... B60L 11/1846

* cited by examiner

*Primary Examiner* — David V Henze-Gongola
(74) *Attorney, Agent, or Firm* — Mark J. Pringle-Rigby

(57) ABSTRACT

The systems, methods, and devices for identifying pairings between vehicles and charge stations are described. In the absence of explicit communication or handshaking between a vehicle and a charge station, location data and charge timing data between charge stations and vehicles is compared. Probabilistic coupling between vehicles and charge stations is determined. Further, overall coupling likelihood for a plurality of vehicles and a plurality of charge stations is determined by comparing scenarios of different coupling combinations.

20 Claims, 11 Drawing Sheets

| | Distance-Based Probabilities | | | |
|---|---|---|---|---|
| | Charge Station 810 | Charge Station 812 | Charge Station 814 | Charge Station 816 |
| Vehicle 830 | 0.06 | 0.15 | 0.25 | 0.10 |
| Vehicle 832 | 0.005 | 0.01 | 0.07 | 0.18 |

| Timing-Based Probabilities | | | | |
|---|---|---|---|---|
|  | Charge Station 810 | Charge Station 812 | Charge Station 814 | Charge Station 816 |
| Vehicle 830 | 0 | 0.012 | 0 | 0.0001 |
| Vehicle 832 | 0 | 0.0005 | 0 | 0.018 |

| | Couple Probabilities | | | |
|---|---|---|---|---|
| | Charge Station 810 | Charge Station 812 | Charge Station 814 | Charge Station 816 |
| Vehicle 830 | 0 | 0.0018 | 0 | 0.00001 |
| Vehicle 832 | 0 | 0.000005 | 0 | 0.00324 |

|  | Vehicle 830 coupled to: | Vehicle 832 coupled to: | Overall Likelihood (multiplication) |
|---|---|---|---|
| Scenario 1 | Charge Station 810 | Charge Station 812 | 0 |
| Scenario 2 | Charge Station 810 | Charge Station 814 | 0 |
| Scenario 3 | Charge Station 810 | Charge Station 816 | 0 |
| Scenario 4 | Charge Station 812 | Charge Station 810 | 0 |
| Scenario 5 | Charge Station 812 | Charge Station 814 | 0 |
| Scenario 6 | Charge Station 812 | Charge Station 816 | 0.000005832 |
| Scenario 7 | Charge Station 814 | Charge Station 810 | 0 |
| Scenario 8 | Charge Station 814 | Charge Station 812 | 0 |
| Scenario 9 | Charge Station 814 | Charge Station 816 | 0 |
| Scenario 10 | Charge Station 816 | Charge Station 810 | 0 |
| Scenario 11 | Charge Station 816 | Charge Station 812 | 0.00000000005 |
| Scenario 12 | Charge Station 816 | Charge Station 814 | 0 |

Figure 14

|  | Vehicle 830 coupled to: | Vehicle 832 coupled to: | Overall Likelihood (logarithm of sum) |
|---|---|---|---|
| Scenario 1 | Charge Station 810 | Charge Station 812 | Log(0) =invalid |
| Scenario 2 | Charge Station 810 | Charge Station 814 | Log(0) =invalid |
| Scenario 3 | Charge Station 810 | Charge Station 816 | Log(0) =invalid |
| Scenario 4 | Charge Station 812 | Charge Station 810 | Log(0) =invalid |
| Scenario 5 | Charge Station 812 | Charge Station 814 | Log(0) =invalid |
| Scenario 6 | Charge Station 812 | Charge Station 816 | Log(0.000005832) =-5.234182484... |
| Scenario 7 | Charge Station 814 | Charge Station 810 | Log(0) =invalid |
| Scenario 8 | Charge Station 814 | Charge Station 812 | Log(0) =invalid |
| Scenario 9 | Charge Station 814 | Charge Station 816 | Log(0) =invalid |
| Scenario 10 | Charge Station 816 | Charge Station 810 | Log(0) =invalid |
| Scenario 11 | Charge Station 816 | Charge Station 812 | Log(0.00000000005) =-10.301029995... |
| Scenario 12 | Charge Station 816 | Charge Station 814 | Log(0) =invalid |

Figure 15

SYSTEMS FOR IDENTIFYING COUPLING BETWEEN VEHICLES AND CHARGE STATIONS

PRIOR APPLICATION DATA

This application claims priority to U.S. Provisional Patent Application No. 63/542,331, titled "Systems and Methods for Identifying Coupling between Vehicles and Charge Stations", filed on Oct. 4, 2023, the entirety of which is incorporated by reference herein.

TECHNICAL FIELD

The present disclosure generally relates to systems, devices, and methods for identifying charging of vehicle batteries, and in particular relates to identifying pairing between vehicles and charge stations.

BACKGROUND

Battery-powered vehicles (e.g. Hybrid electric vehicles, all-electric vehicles, etc.) are a convenient and environmentally friendly means of transportation. A battery-powered vehicle includes at least one battery, which can be charged from an external power source such as a charge station. To effectively manage vehicles and charge stations, it is desirable to be able to identify pairings between vehicles and charge stations.

SUMMARY

According to a broad aspect, the present disclosure describes a method for identifying electrical coupling between a plurality of vehicles and a plurality of charge stations, the method comprising: accessing vehicle location data indicating a respective location of each vehicle of the plurality of vehicles; accessing charge station location data indicating a respective location corresponding to each charge station of the plurality of charge stations; accessing first charge data, the first charge data indicative of a respective charge start time for at least one charge event for each vehicle in the plurality of vehicles; accessing second charge data, the second charge data indicative of a respective charge start time for at least one charge event for each charge station in the plurality of charge stations; determining respective couple likelihoods for each vehicle to be electrically coupled to each charge station as respective candidate vehicle-to-charge station pairs, by: determining respective distance-based likelihoods for each candidate vehicle-to-charge station pair, based on a difference between a respective location of each vehicle as indicated in the vehicle location data and each charge station as indicated in the charge station location data; determining respective timing-based likelihoods for each candidate vehicle-to-charge station pair, based on a difference between a respective charge start time for a respective charge event for each vehicle as indicated in the first charge data and a respective charge start time for a respective charge event for each charge station as indicated in the second charge data; and combining the distance-based likelihood and the timing-based likelihood for each candidate vehicle-to-charge station pair as the respective couple likelihoods for each candidate vehicle-to-charge station pair; for each scenario of a plurality of scenarios, each scenario representing a respective set of candidate vehicle-to-charge station pairs: determining a respective overall likelihood for the scenario, based on an accumulation of the respective couple likelihoods for each candidate vehicle-to-charge station pair in the scenario; identifying a select scenario of the plurality of scenarios, the select scenario being the most likely scenario according to the determined respective overall likelihoods; and outputting an indication of the select scenario.

Combining the distance-based likelihood and the timing-based likelihood for each candidate vehicle-to-charge station pair may comprise multiplying the distance-based likelihood and the timing-based likelihood for each candidate vehicle-to-charge station pair.

For each scenario, determining a respective overall likelihood for the scenario may comprise multiplying the respective couple likelihoods for each candidate vehicle-to-charge station pair in the scenario. Identifying a select scenario of the plurality of scenarios may comprise identifying the select scenario as a scenario having the highest multiplied product of the respective couple likelihoods for each candidate vehicle-to-charge station pair in the scenario.

For each scenario, determining a respective overall likelihood for the scenario may comprise determining a sum of logarithms of the respective couple likelihoods for each candidate vehicle-to-charge station pair in the scenario. Identifying a select scenario of the plurality of scenarios may comprise identifying the select scenario as a scenario having the highest sum of logarithms of the respective couple likelihoods for each candidate vehicle-to-charge station pair in the scenario.

Determining respective distance-based likelihoods for each candidate vehicle-to-charge station pair may comprise, for each candidate vehicle-to-charge station pair, comparing a difference between a location of the vehicle as indicated in the vehicle location data and a location of the charge station as indicated in the charge station location data to a distance histogram based on distance differences between known vehicle-to-charge station pairs.

Determining respective timing-based likelihoods for each candidate vehicle-to-charge station pair may comprise, for each candidate vehicle-to-charge station pair, comparing a difference between a start time of a charge event for the vehicle as indicated in the first charge data and a start time of a charge event for the charge station as indicated in the second charge data to a charge timing histogram based on charge event start time differences between known vehicle-to-charge station pairs. The charge timing histogram may peak at a non-zero charge event start time difference between known vehicle-to-charge station pairs.

The method may further comprise compiling the plurality of scenarios, by including scenarios which include vehicle-to-charge station pairs within at least one pairing threshold, and excluding scenarios which include vehicle-to-charge station pairs outside of the at least one pairing threshold. The at least one pairing threshold may include at least one threshold selected from a group of thresholds consisting of: a start time threshold for a difference in start time between a charge event for the vehicle and charge event for the charge station of a vehicle-to-charge station pair; and a distance threshold for a distance between the vehicle and the charge station.

The respective location corresponding to each charge station of the plurality of charge stations may indicate a location of where a vehicle is positioned when electrically coupled to the charge station.

The respective location corresponding to each charge station of the plurality of charge stations may indicate a location of the respective charge station.

The method may further comprise outputting an indication of any charge stations which are not electrically coupled to a vehicle in the select scenario.

The method may further comprise: accessing additional charge data, the additional charge data indicative of energy supplied by each charge station of the plurality of charge stations over time; identifying, from the set of vehicle-to-charge station pairs in the select scenario, at least one vehicle-to-charge station pair where the charge station is not supplying energy; and outputting an indication of the at least one charge station which is not supplying energy.

According to another broad aspect, the present disclosure describes a system for identifying electrical coupling between a plurality of vehicles and a plurality of charge stations, the system comprising: at least one processor; at least one non-transitory processor-readable storage medium communicatively coupled to the at least one processor, the at least one processor-readable storage medium storing processor-executable instructions which, when executed by the at least one processor, cause the system to: access vehicle location data indicating a respective location of each vehicle of the plurality of vehicles; access charge station location data indicating a respective location corresponding to each charge station of the plurality of charge stations; access first charge data, the first charge data indicative of a respective charge start time for at least one charge event for each vehicle in the plurality of vehicles; access second charge data, the second charge data indicative of a respective charge start time for at least one charge event for each charge station in the plurality of charge stations; determine respective couple likelihoods for each vehicle to be electrically coupled to each charge station as respective candidate vehicle-to-charge station pairs, by: determining respective distance-based likelihoods for each candidate vehicle-to-charge station pair, based on a difference between a respective location of each vehicle as indicated in the vehicle location data and each charge station as indicated in the charge station location data; determining respective timing-based likelihoods for each candidate vehicle-to-charge station pair, based on a difference between a respective charge start time for a respective charge event for each vehicle as indicated in the first charge data and a respective charge start time for a respective charge event for each charge station as indicated in the second charge data; and combining the distance-based likelihood and the timing-based likelihood for each candidate vehicle-to-charge station pair as the respective couple likelihoods for each candidate vehicle-to-charge station pair; for each scenario of a plurality of scenarios, each scenario representing a respective set of candidate vehicle-to-charge station pairs: determine a respective overall likelihood for the scenario, based on an accumulation of the respective couple likelihoods for each candidate vehicle-to-charge station pair in the scenario; identify a select scenario of the plurality of scenarios, the select scenario being the most likely scenario according to the determined respective overall likelihoods; and output an indication of the select scenario.

The processor-executable instructions which cause the system to combine the distance-based likelihood and the timing-based likelihood for each candidate vehicle-to-charge station pair may cause the at least one processor to multiply the distance-based likelihood and the timing-based likelihood for each candidate vehicle-to-charge station pair.

For each scenario, the processor-executable instructions which cause the system to determine a respective overall likelihood for the scenario may cause the at least one processor to multiply the respective couple likelihoods for each candidate vehicle-to-charge station pair in the scenario. The processor-executable instructions which cause the system to identify a select scenario of the plurality of scenarios may cause the at least one processor to identify the select scenario as a scenario having the highest multiplied product of the respective couple likelihoods for each candidate vehicle-to-charge station pair in the scenario.

For each scenario, the processor-executable instructions which cause the system to determine a respective overall likelihood for the scenario may cause the at least one processor to determine a sum of logarithms of the respective couple likelihoods for each candidate vehicle-to-charge station pair in the scenario. The processor-executable instructions which cause the system to identify a select scenario of the plurality of scenarios may cause the at least one processor to identify the select scenario as a scenario having the highest sum of logarithms of the respective couple likelihoods for each candidate vehicle-to-charge station pair in the scenario.

The processor-executable instructions which cause the system to determine respective distance-based likelihoods for each candidate vehicle-to-charge station pair may cause the at least one processor to, for each candidate vehicle-to-charge station pair, compare a difference between a location of the vehicle as indicated in the vehicle location data and a location of the charge station as indicated in the charge station location data to a distance histogram based on distance differences between known vehicle-to-charge station pairs.

The processor-executable instructions which cause the system to determine respective timing-based likelihoods for each candidate vehicle-to-charge station pair may cause the at least one processor to, for each candidate vehicle-to-charge station pair, compare a difference between a start time of a charge event for the vehicle as indicated in the first charge data and a start time of a charge event for the charge station as indicated in the second charge data to a charge timing histogram based on charge event start time differences between known vehicle-to-charge station pairs. The charge timing histogram may peak at a non-zero charge event start time difference between known vehicle-to-charge station pairs.

The processor-executable instructions may further cause the system to compile the plurality of scenarios, by including scenarios which include vehicle-to-charge station pairs within at least one pairing threshold, and excluding scenarios which include vehicle-to-charge station pairs outside of the at least one pairing threshold. The at least one pairing threshold may include at least one threshold selected from a group of thresholds consisting of: a start time threshold for a difference in start time between a charge event for the vehicle and charge event for the charge station of a vehicle-to-charge station pair; and a distance threshold for a distance between the vehicle and the charge station.

The respective location corresponding to each charge station of the plurality of charge stations may indicate a location of where a vehicle is positioned when electrically coupled to the charge station.

The respective location corresponding to each charge station of the plurality of charge stations may indicate a location of the respective charge station.

The processor-executable instructions may further cause the system to output an indication of any charge stations which are not electrically coupled to a vehicle in the select scenario.

The processor-executable instructions may further cause the system to: access additional charge data, the additional charge data indicative of energy supplied by each charge station of the plurality of charge stations over time; identify, from the set of vehicle-to-charge station pairs in the select scenario, at least one vehicle-to-charge station pair where the charge station is not supplying energy; and output an indication of the at least one charge station which is not supplying energy.

The system may further comprise a plurality of vehicle devices, each vehicle device positioned in a respective vehicle of the plurality of vehicle devices, and each vehicle device comprising: a location sensor to capture a respective portion of the vehicle location data indicating a location of a vehicle in which the vehicle device is positioned; and a communication interface to transmit the respective portion of the location data to a management device which comprises the at least one processor and the at least one non-transitory processor-readable storage medium.

The system may further comprise a plurality of vehicle devices, each vehicle device positioned in a respective vehicle of the plurality of vehicle devices, and each vehicle device comprising: a charge data sensor to capture a respective portion of the first charge data indicating a charge start time for a charge event for a vehicle in which the vehicle device is positioned; and a communication interface to transmit the respective portion of the first charge data to a management device which comprises the at least one processor and the at least one non-transitory processor-readable storage medium.

The processor-executable instructions which cause the system to access the charge station location data may cause the system to retrieve the charge station location data from a database.

The system may further comprise the plurality of charge stations, each charge station comprising: a charge data sensor to capture a respective portion of the second charge data indicating a charge start time for a charge event for the charge station; and a communication interface to transmit the respective portion of the first charge data to a management device which comprises the at least one processor and the at least one non-transitory processor-readable storage medium.

BRIEF DESCRIPTION OF THE DRAWINGS

Exemplary non-limiting embodiments are described with reference to the accompanying drawings in which:

FIGS. 14 and 15 are tables showing overall likelihoods for different scenarios of vehicle-to-charge station pairs, in accordance with at least two illustrated examples.

DETAILED DESCRIPTION

The present disclosure details systems, methods, and devices for identifying pairings between vehicles and charge stations.

Figure 1:
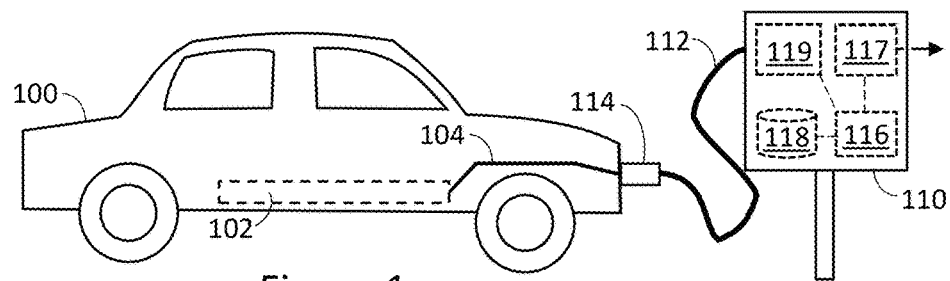
FIGS. 1, 2, 3, and 4 are schematic diagrams of exemplary setups where a vehicle battery is connected to a charge station to charge.

FIG. 1 is a schematic diagram of an exemplary charging arrangement. FIG. 1 illustrates a vehicle 100, having a battery 102, which can receive electrical energy (power) from an external power source by electrical pathway 104. "Electrical pathway" (sometimes shortened to "pathway") as used throughout this disclosure refers to at least one electrically conductive component which provides electrical coupling, such as wires, conductive traces, contacts, or any other appropriate electrically conductive component. An electrical pathway can be a single electrically conductive component (e.g. a single wire), but this is not necessarily the case. For example, an electrical pathway could include a plurality of wires, conductive traces, or contacts. Battery 102 stores received energy.

In the example of FIG. 1, the external power source is charge station 110. Charge station 110 provides power to the vehicle 100 in a format which can be received by vehicle 100 to charge battery 102. In the illustrated example, charge station 110 outputs power by electrical pathway 112 (illustrated as at least one wire) to an electrical couple 114. Electrical couple 114 couples to vehicle 100 (e.g. by a coupling interface such as a plug), to provide a pathway for energy to flow from charge station 110 to battery 102. Charge station 110 receives energy for example from a power grid, solar panels, or any other appropriate source of energy, and converts this energy to a format (e.g. voltage and amperage) acceptable to vehicle 100. Charge station 110 could for example be installed at the vehicle owner's residence. As other examples, charge station 110 could be installed in a public location such as a workplace, parking lot, shopping center, rest stop, or any other appropriate location. Additionally, electrical pathway 112 is not limited to being used to provide power to the vehicle. Electrical pathway 112 could also be used for communication of signals between vehicle 100 and charge station 110. To this end, electrical pathway 112 can include a plurality of pathways, such as at least one pathway for provision of power to battery 102, and at least one other pathway for transmission of communication signals between vehicle 100 and charge station 110.

FIG. 1 also illustrates charge station 110 as including at least one processor 116, a communication interface 117, at least one non-transitory processor-readable storage medium 118, and at least one sensor 119. Charge station 110 in FIG.

1 is a "smart charge station", in that charge station 110 can do more than just provide energy to vehicle 100. For example, the at least one processor 116 can monitor energy provided by charge station 110 over time, monitor and/or analyze a state of connection of charge station 110 to vehicle 100, and/or collect or prepare charge data. The at least one processor 116 can prepare charge data including any of energy flow rate (power), amperage, voltage, start time, end time, or duration of energy transfer, waveforms representing a combination of attributes, or any other appropriate data. The at least one processor 116 can construct, format, process, or compress the data as needed, or the at least one processor 116 can prepare raw data. Collection of raw data can be performed using any appropriate hardware, such as the at least one sensor 119. The at least one sensor 119 could include, as non-limiting examples, voltage or current detection circuits, or any other appropriate hardware that can sense electrical attributes. The at least one sensor 119 could also include any appropriate sensor for collecting data regarding a state of electrical couple 114 (couple data). For example, the at least one sensor 119 could include a proximity sensor which detects whether the electrical couple 114 is properly stowed away, which is indicative of the electrical couple not being connected to vehicle 100 (e.g., sensor 119 could include a depression switch or contact circuit which is triggered by the electrical couple being stowed away). As another example, the at least one sensor 119 could include a proximity sensor which detects whether the electrical couple 114 is connected to vehicle 100 (e.g. a depression switch or electrical contact circuit which is triggered by the electrical couple being connected to vehicle 100).

Collected data can be stored in the at least one non-transitory processor-readable storage medium 118. Further, the at least one non-transitory processor-readable storage medium 118 can store instructions which, when executed by the at least one processor 116, cause the at least one processor 116 to prepare data (such as charge data or sensor data).

Charge station 110 in FIG. 1 also includes at least one communication interface 117 (such as wireless communication hardware, or wired communication hardware). For example, charge station 110 could couple to a wireless (or wired) network. Charge station 110 can communicate data, such as charge data or couple data, over the network. Such an implementation is discussed in more detail later with reference to FIG. 6.

Figure 2:
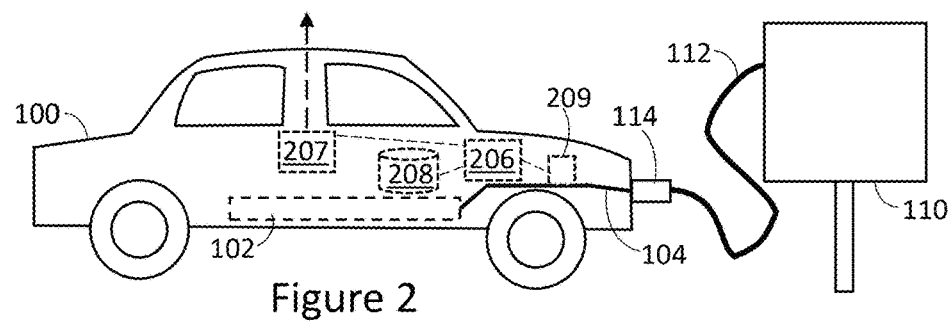

FIG. 2 is a schematic view of an exemplary charging arrangement similar to that illustrated in FIG. 1. Description of elements in FIG. 1 applies to similarly numbered elements in FIG. 2. FIG. 2 includes a vehicle 100 and charge station 110 similar to as described in FIG. 1. In FIG. 2, vehicle 100 is shown as including at least one processor 206, at least one communication interface 207, at least one non-transitory processor-readable storage medium 208, and at least one sensor 209. The at least one processor 206 is similar to the at least one processor 116, in that the at least one processor 206 can similarly monitor energy provided by charge station 110, monitor and/or analyze a state of connection of charge station 110 to vehicle 100, and/or collect or prepare charge data. The at least one non-transitory processor-readable storage medium 208 is similar to the at least one non-transitory processor-readable storage medium 118, in that the at least one non-transitory processor readable storage medium 208 can similarly store instructions or data (such as charge data or couple data). The at least one sensor 209 is similar to the at least one sensor 119, in that the at least one sensor 209 can similarly monitor charging and collect charge data, and/or can collect couple data regarding the state of electrical couple 114. For example, any or all of the at least one processor 206, the at least one communication interface 207, the at least one non-transitory processor-readable storage medium 208, and/or the at least one sensor 209 can be included in a telematics monitoring device, which collects vehicle-related data and transmits the vehicle related data to a management server, as discussed later with reference to FIG. 5. It is not required that each of the at least one processor 206, the at least one communication interface 207, the at least one non-transitory processor-readable storage medium 208, and the at least one sensor 209 be included in a telematics monitoring device. As one particular example, the at least one sensor 209 may be integrated with the vehicle 100 (e.g. as a battery voltage sensor), and may be coupled to the telematics monitoring device to provide sensor data thereto.

FIG. 2 highlights that collection and/or analysis of charge data can occur in vehicle 100. However, this does not preclude charge station 110 in FIG. 2 from collection and/or analysis of charge data (e.g. charge station 110 in FIG. 2 can be a "smart charge station" similar to as in FIG. 1). While specific elements of charge station 110 discussed with reference to FIG. 1 are not illustrated in FIG. 2 to reduce clutter, this does not necessarily mean such elements are not included. While there are some protocols for exchanging charge data between a charge station and a vehicle, such protocols are not yet in common or general use (particularly for light and medium duty vehicles). As a result, it is useful for both vehicle 100 and charge station 110 to collect and/or analyze charge data, and report the same (e.g. via communication interface 117 or 207).

Figure 3:
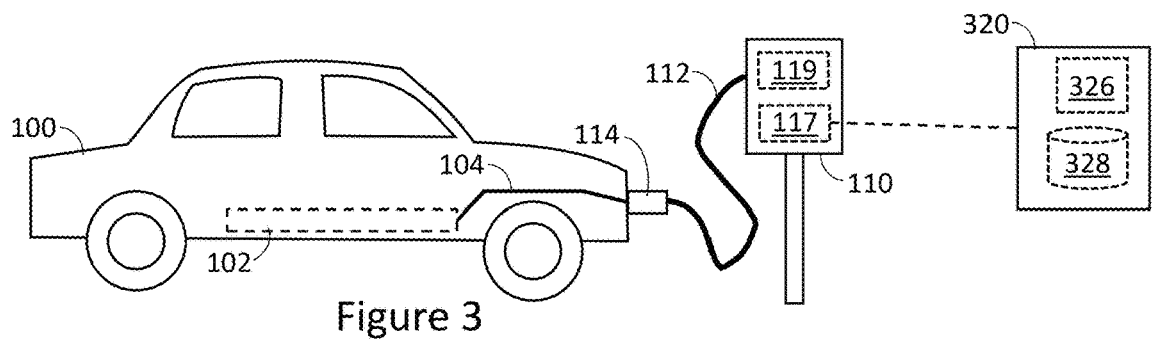

FIG. 3 is a schematic view of an exemplary charging system similar to that illustrated in FIGS. 1 and 2. Description of elements in FIGS. 1 and 2 applies to similarly numbered elements in FIG. 3. FIG. 3 includes a vehicle 100 and charge station 110 similar to as described in FIGS. 1 and 2. In FIG. 3, a remote device 320 is illustrated (such as a remote server). Remote device 320 includes at least one processor 326 similar to the at least one processor 116 and the at least one processor 206, in that the at least one processor 326 can similarly analyze/process data such as charge data. Remote device 320 includes at least one non-transitory processor-readable storage medium 328 which is similar to the at least one non-transitory processor-readable storage medium 118 and the at least one non-transitory processor-readable storage medium 208, in that the at least one non-transitory processor readable storage medium 328 can similarly store instructions or data (such as charge data). FIG. 3 illustrates the at least one sensor 119, which can monitor charging and/or collect data (such as charge data or couple data) similar to as discussed above with reference to FIG. 1. In some implementations, collected data can be transmitted from charge station 110 to remote device 320 by communication interface 117. Communication interface 117 can for example be a wired connection between charge station 110 and remote device 320. As another example, communication interface 117 can be a wireless connection between charge station 110 and remote device 320. Further, communication interface 117 can communicate data directly to remote device 320 as illustrated, or indirectly (e.g. via a network, could, or internet, as examples). Further still, remote deice 320 can be an intermediate device, which transmits data from charge station 110 (or some modified form of the data) to another device. In an exemplary implementation, remote device 320 is a device belonging to a charge network which supports charge station 110. Data from charge station 110 can be transmitted to the remote device, and further transmitted to another device which performs vehicle to charge station pairing based thereon.

FIG. 3 highlights that analysis of data (such as couple data or charge data) can occur remotely from vehicle 100 and charge station 110. However, this does not preclude charge station 110 in FIG. 3 from having at least one processor 116 and at least one non-transitory processor-readable storage medium 118 as in FIG. 1, nor does it preclude vehicle 100 from having at least one processor 206 and at least one non-transitory processor-readable storage medium 208 as in FIG. 2, as appropriate for a given application. For example, preparation of data could be performed by the at least one processor 116 in FIG. 1, said data subsequently being transmitted to remote device 320. Analysis of said data can then be performed by the at least one processor 326 of remote device 320.

Figure 4:
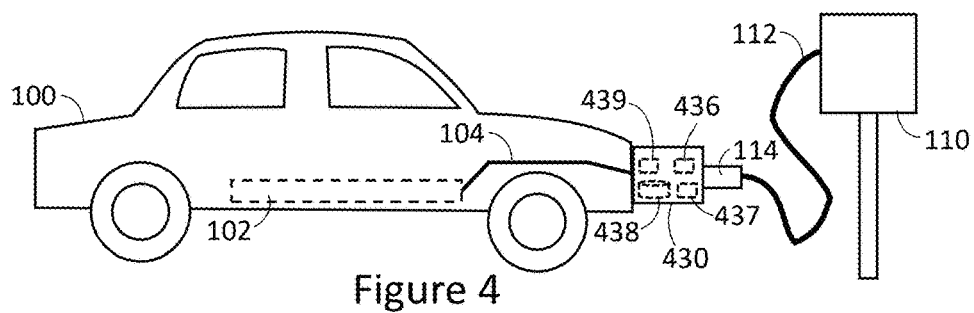

FIG. 4 is a schematic view of an exemplary charging system similar to that illustrated in FIGS. 1, 2, and 3. Description of elements in FIGS. 1, 2, and 3 applies to similarly numbered elements in FIG. 4. FIG. 4 includes a vehicle 100 and charge station 110 similar to as described in FIGS. 1, 2, and 3. In FIG. 4, an intermediate device 430 is illustrated. Intermediate device 430 includes at least one processor 436 similar to the at least one processor 116, the at least one processor 206, and the at least one processor 326, in that the at least one processor 436 can similarly monitor energy provided by charge station 110, monitor and/or analyze a state of connection of charge station 110 to vehicle 100, and/or collect or prepare charge data. Intermediate device 430 includes at least one non-transitory processor-readable storage medium 438 which is similar to the at least one non-transitory processor-readable storage medium 118, the at least one non-transitory processor-readable storage medium 208, and the at least one non-transitory processor-readable storage medium 328, in that the at least one non-transitory processor readable storage medium 438 can similarly store instructions or data (such as charge data or couple data). Intermediate device 430 includes at least one sensor 439 which is similar to the at least one sensor 119 and the at least one sensor 209, in that the at least one sensor 439 can similarly monitor charging and collect charge data, and/or can collect couple data regarding the state of electrical couple 114. Intermediate device 430 also includes at least one communication interface, similar to communication interfaces 117 and 207, which can transmit data collected by intermediate device 430 (e.g. to a management server).

Intermediate device 430 is positioned intermediate to vehicle 100 and charge station 110 (illustrated as being coupled between electrical couple 114 and vehicle 100), such that energy provided by charge station 110 to vehicle 100 passes through intermediate device 430. In this way, the at least one sensor 439 can monitor energy provided to vehicle 100, and collect charge data. The at least one sensor 439 can include any appropriate sensors or hardware to enable this, such as voltage or current sensing circuits. This charge data can be analyzed by the at least one processor 436, or the at least one sensor 439 can provide the charge data to another device for analysis (in some implementations after some preparation by the at least one processor 436, such as compression for formatting). In the illustrated example, data is transmitted by communication interface 437. Such a communication interface could be wireless, or could be wired (e.g. through electrical pathway 112).

The at least one sensor 439 could include a proximity sensor which detects whether the electrical couple 114 is connected to vehicle 100. For example, the at least one sensor 439 could include a depression switch which is pressed in when the electrical couple is connected to vehicle 100. As another example, the at least one sensor 439 could include an electrical contact circuit which is closed when the electrical couple is connected to vehicle 100. Any other appropriate proximity or connection sensor could be included, which is indicative of the electrical couple 114 being connected to vehicle 100.

The inclusion of intermediate device 430 does not preclude charge station 110 from including at least one processor 116 or at least one non-transitory processor-readable storage medium 118 as in FIG. 1, nor does it preclude vehicle 100 from including at least one processor 206 or at least one non-transitory processor-readable storage medium 208 as in FIG. 2. However, intermediate device 430 provides a means for collecting, preparing, analyzing, and/or transmitting data (such as charge data or couple data), and is particularly useful when other elements of the system lack such functionality. For example, intermediate device 430 is particularly useful for retrofitting systems which lack the ability to collect, prepare, analyze, and/or transmit charge or couple data.

As mentioned earlier with reference to FIG. 2, a telematics monitoring device can be used to collect and report charge data for vehicles. Telematics data for use in the methods or by the systems discussed herein can be collected by a telematics monitoring device in each vehicle of a plurality of vehicles, or by at least one sensor in each vehicle of the plurality of vehicles. Generally, a telematics system monitors a vehicle using an onboard telematic monitoring device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematic monitoring device may detect environmental operating conditions associated with a vehicle, for example, outside temperature, attachment status of an attached trailer, and temperature inside an attached refrigeration trailer. A telematic monitoring device may also detect operating conditions of an associated vehicle, such as position, (e.g., geographic coordinates), speed, and acceleration, time of day of operation, distance traveled, stop duration, customer location, idling duration, driving duration, among others. Additionally, as mentioned earlier, a telematic monitoring device can also detect provision of electrical energy to the vehicle or to a battery of the vehicle (charge data), and or a state of electrical coupling to the vehicle (e.g. data indicating whether an electrical couple is connected to a charge port of the vehicle). Hence, the telematic monitoring device collects and transmits telematic data to the telematics system that is representative of the vehicle operation and usage execution. This data may be collected over a time period of sufficient duration to permit to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematic monitoring device to a remote subsystem, (e.g., data management system which may comprise a cloud system or a management system). Raw vehicle data may include information indicating the identity of the onboard telematic monitoring device (e.g., device identifier, device ID) and/or the identity of the associated vehicle the onboard telematic monitoring device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematic monitoring device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem.

In other exemplary telematics systems, a telematic monitoring device can have at least one processing unit thereon which processes or filters raw vehicle data, and transmits processed or filtered data. Such systems can reduce the bandwidth required for transmission and required storage capacity for transmitted data.

Figure 5:
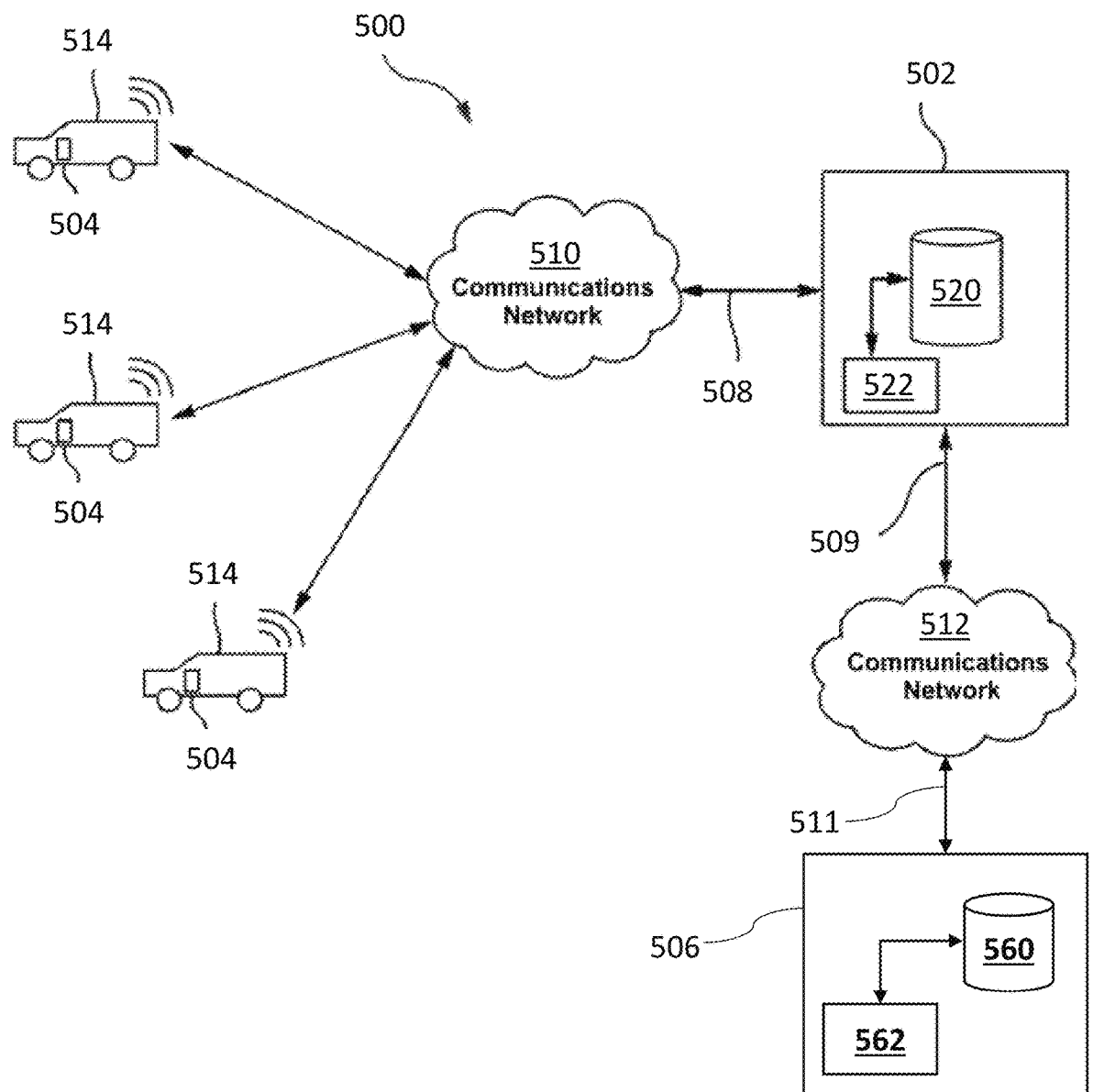
FIG. 5 is a block diagram of a system for gathering and storing vehicle operation information.

Illustrated in FIG. 5 is a simplified block diagram of an exemplary system 500 for gathering and storing vehicle operation information. System 500 comprises management device 502 having a first network interface 508 and onboard telematic monitoring devices 504 of vehicles 514 communicatively coupled therewith via communication network 510.

The management device 502 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, management device 502 includes at least one non-transitory processor-readable storage medium 520 and at least one processor 522. The at least one non-transitory processor-readable storage medium 520 can store data on which analytics is performed, and/or can store instructions thereon. Said instructions, when executed by the at least one processor 522, cause the management device to perform the desired operations, analysis, or data collection/aggregation.

Communication network 510 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 510 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi®, Bluetooth®, Ethernet, HTTP/S, TCP, and CoAP/DTLS, or other suitable protocol. Communication network 510 may take other forms as well.

System 500 may comprise another network interface 509 for communicatively coupling to another communication network 512. In an implementation, communication network 512 may comprise a communication gateway between the fleet owners and the system 500.

Also shown in FIG. 5 are vehicles 514, each thereof having aboard the onboard telematic monitoring devices 504. A vehicle may include a car, truck, recreational vehicle, heavy equipment, tractor, snowmobile, or other transportation asset. Onboard telematic monitoring devices 504 may transmit raw vehicle data associated with vehicles 514 through the communication network 510 to the management device 502.

Three telematic monitoring devices 504 are described in this example for explanation purposes only and embodiments are not intended to be limited to the examples described herein. In practice, a system may comprise many vehicles 514, such as hundreds, thousands and tens of thousands or more. Thus, huge volumes of raw vehicle data may be received and stored by remote management device 502.

In general, telematic monitoring devices 504 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, times of operation, and input or output energy (charge start time, charge end time, charge rate, charge profile curves, etc.) among others. One of ordinary skill in the art will appreciate that these are but a few types of vehicle operating conditions that may be detected.

Telematic monitoring device 504 may comprise a sensing module for determining vehicle position. For instance, the sensing module may utilize Global Positioning System (GPS) technology (e.g., GPS receiver) for determining the geographic position (Lat/Long coordinates) of vehicle 514. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematic monitoring device 504 may communicate with a plurality of sensing modules for a vehicle.

In general, a vehicle 514 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematic monitoring device 504 may comprise a monitoring module operable to communicate with a data/communication bus of vehicle 514. The monitoring module may communicate via a direct connection, such as, electrically coupling, with a data/communication bus of vehicle 514 via a vehicle communication port, (e.g., diagnostic port/communication bus, OBDII port). Alternatively, the monitoring module may comprise a wireless communication interface for communicating with a wireless interface of the data/communication bus of vehicle 514. Optionally, a monitoring module may communicate with other external devices/systems that detect operating conditions of the vehicle.

In some implementations, any of telematics monitoring devices 504 could be monolithically packaged (i.e. as a single device which is plugged into other otherwise installed in a respective vehicle 514). Alternatively, telematic monitoring device 504 may not be a single monolithic device, but may rather represent a plurality of components within a vehicle 514. For example, at least one sensor integrated within a vehicle 514 may collect telematics data, and provide this telematics data to a processor or communication interface of vehicle 514, for processing and/or communication to management device 502. Further, telematic monitoring device 504 may include components which are not dedicated to telematics. For example, sensors in a vehicle 514 can collect data which is used to display helpful information or warnings to a driver of the vehicle, and may also be transmitted to management device 502 for telematic purposes (e.g. a voltage sensor for a vehicle battery may be integrated in a vehicle, and telematic monitoring device 504 may receive data from the voltage sensor).

Telematic monitoring device 504 may be configured to wirelessly communicate with management device 502 via a wireless communication module. In some embodiments, telematic monitoring device 504 may directly communicate with one or more networks outside vehicle 514 to transmit data to management device 502. A person of ordinary skill will recognize that functionality of some modules may be implemented in one or more devices and/or that functionality of some modules may be integrated into the same device.

Telematic monitoring devices 504 may transmit raw vehicle data, indicative of vehicle operation information collected thereby, to management device 502. The raw vehicle data may be transmitted at predetermined time intervals, (e.g. heartbeat), intermittently, and/or according to other predefined conditions. Raw vehicle data transmitted from telematic monitoring devices 504 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

FIG. 5 also illustrates an additional device 506 having a network interface 511 for communication via communications network 512. The additional device 506 in an implementation comprises another management system or device which is a data warehouse for performing analytics on data stored therein (similar to management device 502). In another implementation, the another management system may comprise a plurality of management systems, datastores, and other devices, configured in a centralized, distributed or other arrangement (similar to management device 502). In some implementations, one or more different management systems may be employed and configured separately or in a centralized, distributed or other arrangement as the additional device 506 (similar to management device 502). In the illustrated example, the additional device 506 includes at least one non-transitory processor-readable storage medium 560 and at least one processor 562. The at least one non-transitory processor-readable storage medium 560 can store data on which analytics is performed, and/or can store instructions thereon. Said instructions, when executed by the at least one processor 562, cause the management device to perform the desired operations, analysis, or data collection/aggregation.

Additional device 506 is described in a similar manner to management device 502, and these devices can comprise similar hardware or components. One difference between management device 502 and management device 506 is that the additional device 506 is a step removed from vehicles 514 (i.e. data from telematics monitoring devices 504 is provided to management device 502, and in turn can be provided to device 506). This illustrates that while management device 502 can perform more direct management of data from telematic monitoring device 504, and possibly management of vehicles 514, collected data can also be provided to another device (device 506) for analysis and use. In this sense, additional device 506 is optional in the context of system 500.

Like the exemplary telematics system discussed with reference to FIG. 5, data from a plurality of charge stations may also be transmitted to a remote subsystem (e.g., data management system which may comprise a cloud system or a management system). Exemplary data which can be transmitted from charge stations is discussed earlier with reference to FIGS. 1, 2, 3, and 4. As discussed earlier, a charge station or intermediate device which collects charge data can have at least one processing unit thereon which processes or filters raw data, and transmits processed or filtered data. Such systems can reduce the bandwidth required for transmission and required storage capacity for transmitted data.

Figure 6:
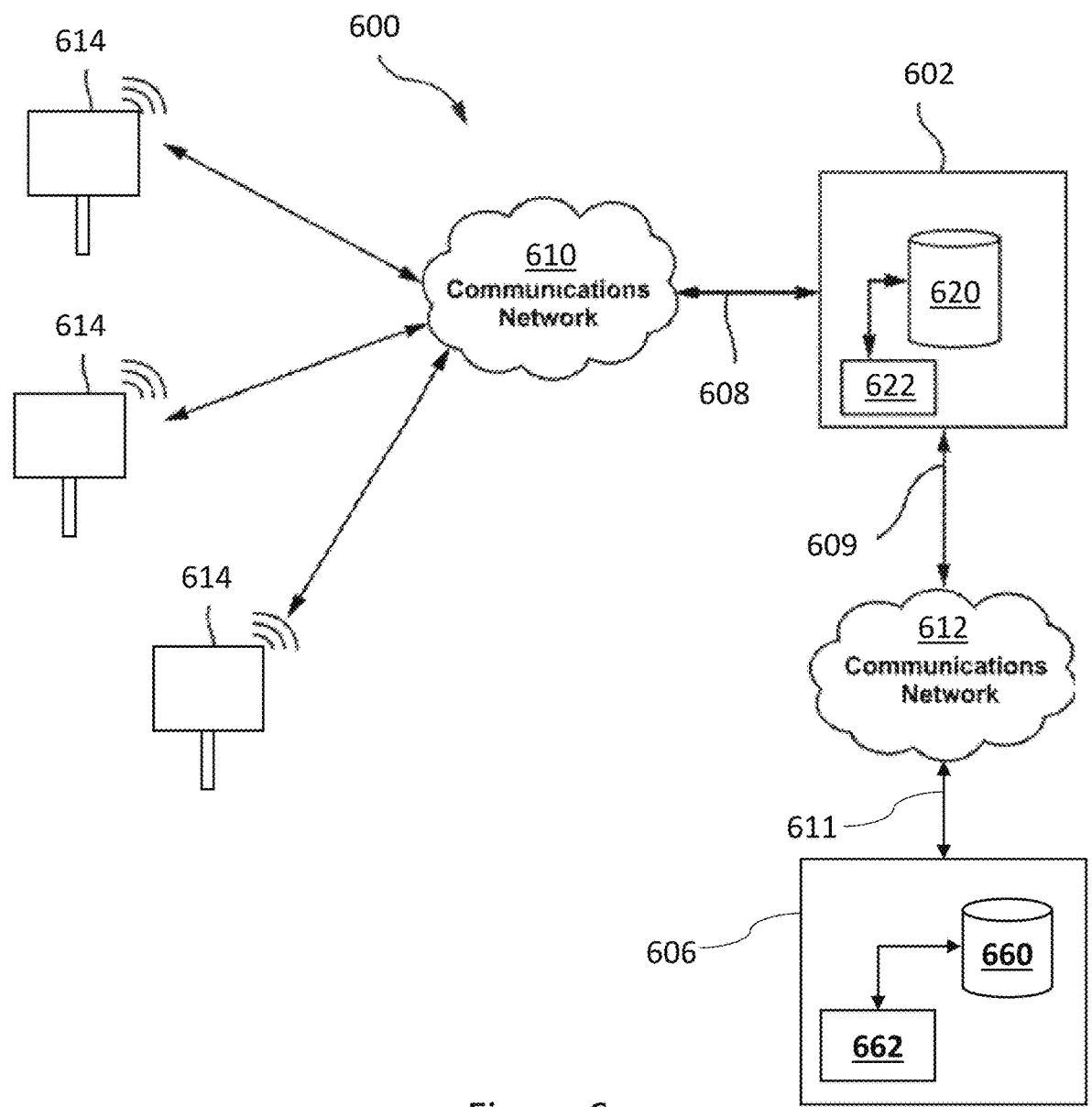
FIG. 6 is a block diagram of a system for gathering and storing charge station operation information.

Illustrated in FIG. 6 is a simplified block diagram of an exemplary system 600 for gathering and storing data from a plurality of charge stations. System 600 comprises management device 602 having a first network interface 608, and charge stations 614 communicatively coupled therewith via communication network 610.

The management device 602 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, management device 602 includes at least one non-transitory processor-readable storage medium 620 and at least one processor 622. The at least one non-transitory processor-readable storage medium 620 can store data on which analytics is performed, and/or can store instructions thereon. Said instructions, when executed by the at least one processor 622, cause the management device to perform the desired operations, analysis, or data collection/aggregation.

Communication network 610 may include one or more computing systems and may be any suitable combination of networks or portions thereof to facilitate communication between network components. Some examples of networks are discussed earlier with reference to communication network 510, are fully applicable to communication network 610, and are note repeated for brevity.

System 600 may comprise another network interface 609 for communicatively coupling to another communication network 612. In an implementation, communication network 612 may comprise a communication gateway between the fleet owners and the system 600.

Three charge stations 614 are described in this example for explanation purposes only and embodiments are not intended to be limited to the examples described herein. In practice, a system may comprise many charge stations 614, such as hundreds, thousands and tens of thousands or more. Thus, huge volumes of raw vehicle data may be received and stored by remote management device 602.

Exemplary charge stations are discussed with reference to FIGS. 1, 2, 3, and 4. This discussion is fully applicable to charge stations 614 in FIG. 6, and is not repeated for brevity. Throughout this disclosure, reference to a charge station (such as charge stations 614) performing operations such as collecting data, sensing data, performing actions on data, or transmitting data, can also refer to another device communicatively coupled to the charge station (e.g. remote device 320 or intermediate device 430) performing said operations.

In some implementations, charge stations 614 may comprise a sensing module for determining charge station position. For instance, the sensing module may utilize Global Positioning System (GPS) technology (e.g., GPS receiver) for determining the geographic position (Lat/Long coordinates) of vehicle 514. Alternatively, the sensing module utilizes another a global navigation satellite system (GNSS) technology, such as, GLONASS or BeiDou. Alternatively, the sensing module may further utilize another kind of technology for determining geographic position. Alternatively, charge station location can be determined at time of installation (e.g. using a portable location detection device used by the installer), and the location of the charge station can be input into a database for future access. Further alternatively, charge station location can be determined based on vehicle location data. For example, vehicle location data for a number of vehicles which couple to a particular charge station can be collected and aggregated (e.g. by a management device) to determine a location corresponding to the charge station as a location where vehicles tend to park to use the charge station.

Charge stations 614 may be configured to wirelessly communicate with management device 602 via a wireless communication module. In some embodiments, charge stations 614 may directly communicate with one or more networks outside charge stations 614 to transmit data to management device 602. A person of ordinary skill will recognize that functionality of some modules may be implemented in one or more devices and/or that functionality of some modules may be integrated into the same device.

Charge stations 614 may transmit raw data, indicative of charge or power transfer-related information collected thereby, to management device 602. The raw vehicle data may be transmitted at predetermined time intervals, (e.g. heartbeat), intermittently, and/or according to other predefined conditions. Raw vehicle data transmitted from charge stations 614 may include information indicative of energy transfer curves, for example.

FIG. 6 also illustrates an additional device 606 having a network interface 611 for communication via communications network 612. The additional device 606 in an implementation comprises another management system or device which is a data warehouse for performing analytics on data stored therein (similar to management device 602). In another implementation, the another management system may comprise a plurality of management systems, data stores, and other devices, configured in a centralized, distributed or other arrangement (similar to management device 602). In some implementations, one or more different management systems may be employed and configured separately or in a centralized, distributed or other arrangement as the additional device 606 (similar to management device 602). In the illustrated example, the additional device 606 includes at least one non-transitory processor-readable storage medium 660 and at least one processor 662. The at least one non-transitory processor-readable storage medium 660 can store data on which analytics is performed, and/or can store instructions thereon. Said instructions, when executed by the at least one processor 662, cause the management device to perform the desired operations, analysis, or data collection/aggregation.

Additional device 606 is described in a similar manner to management device 602, and these devices can comprise similar hardware or components. One difference between management device 602 and management device 606 is that the additional device 606 is a step removed from charge stations 614 (i.e. data from charge stations 614 is provided to management device 602, and in turn can be provided to device 606). This illustrates that while management device 602 can perform more direct management of data from charge stations 614, and possibly management of charge stations 614, collected data can also be provided to another device (device 606) for analysis and use. In this sense, additional device 606 is optional in the context of system 600.

FIGS. 5 and 6 illustrate two systems, one for collecting vehicle data from vehicles (FIG. 5) and one for collecting charge station data from charge stations (FIG. 6). In some implementations, these two systems can be implemented as a unified system which collects both vehicle data from vehicles and charge station data from charge stations. For example, management device 502 and management device 602 can be the same device, and/or additional device 506 and additional device 606 can be the same device. In this way, vehicle data and charge station data can be collected at a common management device, for analysis thereof.

In other implementations, system 500 in FIG. 5 and system 600 in FIG. 6 can be separate systems which are interconnected or in communication with each other. For example, management device 502 and management device 602 can be separate devices, but the additional device 506 can be the same device as the additional device 606. In this way, management device 502 collects vehicle data from vehicles, management device 602 collects charge station data from charge stations, and the vehicle data and charge station data is collected at a common device 506/606 for analysis thereof. As another example, the additional device 506 can be the same device as management device 602. In this example, management device 502 collects vehicle data from vehicles, and provides the vehicle data to management device 602 which collects charge station data from charge stations. In this way, management device 602 has access to vehicle data and charge station data for analysis. As yet another example, the additional device 606 can be the same device as management device 502. In this example, management device 602 collects charge station data from charge stations, and provides the charge station data to management device 502 which collects vehicle data from vehicles. In this way, management device 502 has access to vehicle data and charge station data for analysis.

The above examples are helpful when charge data and vehicle data is collected by different entities. For example, data from an entity which focuses on vehicle data (e.g. a vehicle telematics provider) and data from an entity which focuses on charge station data (e.g. a charge station management provider) can be collected together by an appropriate entity, for useful analysis.

Figure 7:
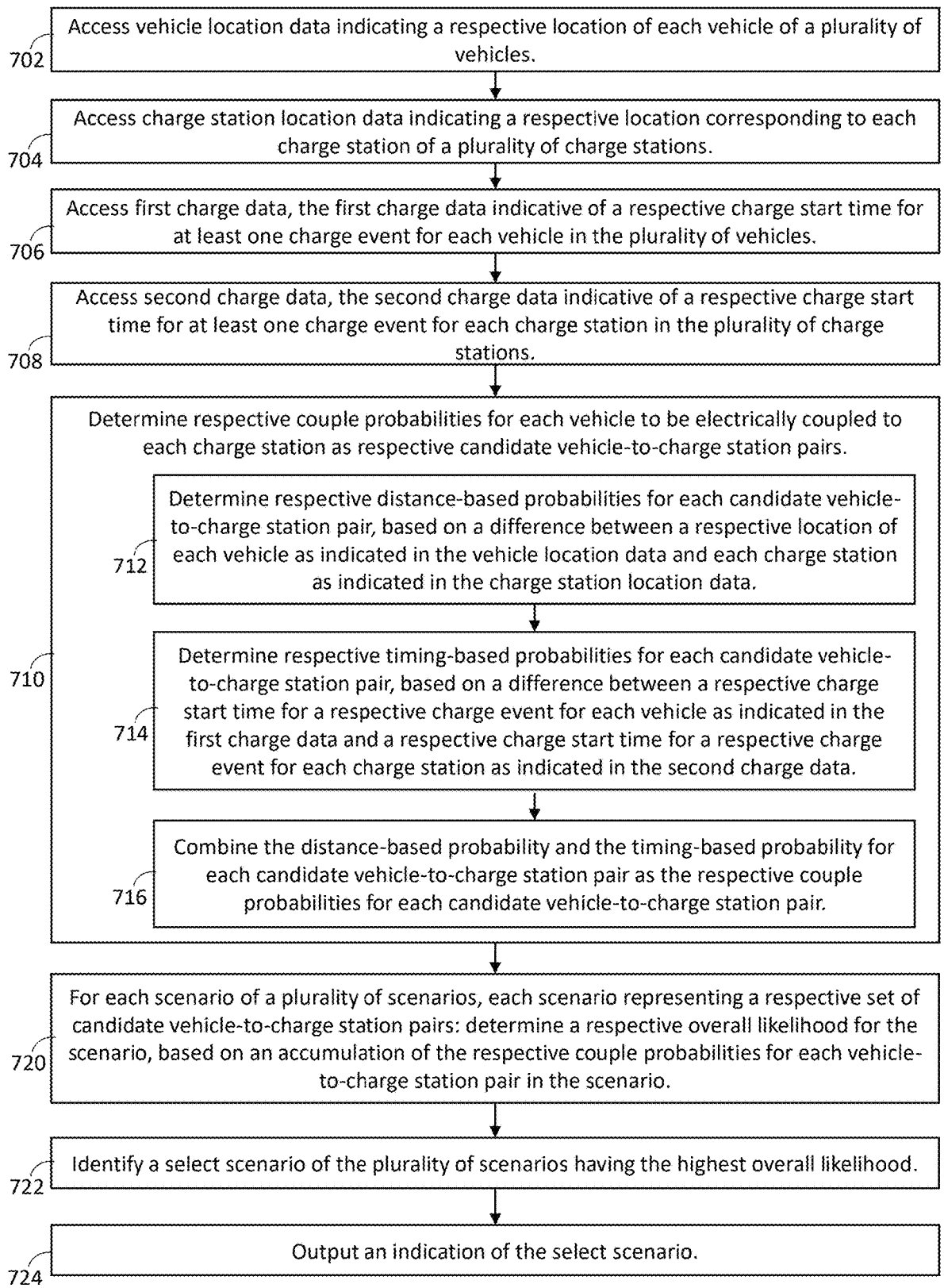
FIG. 7 is a flowchart diagram which illustrates a method of determining vehicle-to-charge station pairs, in accordance with at least one exemplary implementation.

FIG. 7 is a flowchart diagram which illustrates an exemplary method 700 of controlling or influencing charging of any of the batteries described herein. Method 700 as illustrated includes acts 702, 704, 706, 708, 710 (including sub-acts 712, 714, and 716), 720, 722, and 724. One skilled in the art will appreciate that additional acts could be added, acts could be removed, or acts could be reordered as appropriate for a given application. Method 700 in FIG. 7 can utilize any appropriate hardware, for example any of the hardware discussed above with reference to FIGS. 1, 2, 3, 4, 5, and 6. As a particular example, method 700 can be performed by a management device which has access to vehicle data and charge data for vehicles and charge stations, such as any of management devices 502, 506, 602, or 606. Further, said management device can be operated in accordance with processor-executable instructions stored on at least one non-transitory processor-readable storage medium, which when executed by at least one processor of the management device cause the management device to perform the acts of method 700. With reference to the examples illustrated in FIGS. 5 and 6, any of the at least one non-transitory processor-readable storage mediums 520, 560, 620, or 660 could have instructions stored thereon, which when executed by a respective at least one processor (processors 522, 562, 622, 662) cause the respective management device to perform the method 700. In this sense, method 700 can also be implemented as a computer program product (processor-executable instructions or data) stored at an appropriate non-transitory processor-readable storage medium. Further, method 700 is not limited to being performed by the management devices shown in FIGS. 5 and 6. In some implementations, method 700 can be performed by user device or terminal (e.g. a computer, smartphone, tablet, or other appropriate device) which has access to vehicle data and charge station data collected by said management devices.

Method 700 is discussed with reference to an example situation illustrated in FIG. 8. The situation of FIG. 8 is merely one example used for the purposes of illustration, and method 700 can be applied in many other situations.

Figures 8, 9:
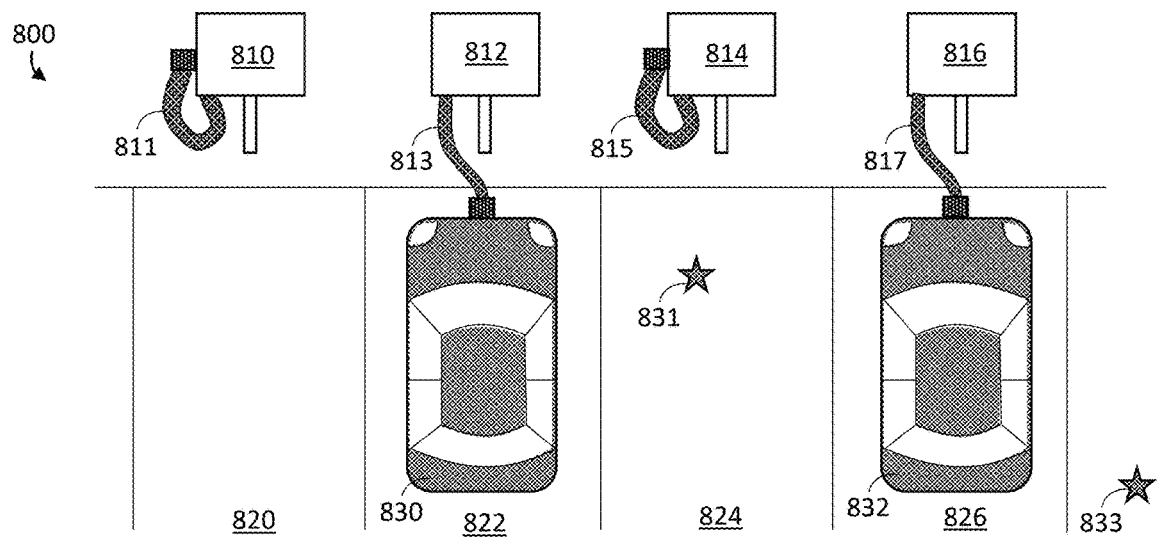
FIG. 8 is a top view of an exemplary charging situation for a plurality of charge stations and vehicles.
FIG. 9 is a table showing exemplary distance-based likelihoods for candidate vehicle-to-charge station pairs.

FIG. 8 is a top view of an exemplary situation 800. FIG. 8 shows a plurality of charge stations 810, 812, 814, and 816. In this example four charge stations are shown, but in other situations any appropriate number of charge stations could be included. Charge station 810 is associated with an electrical couple 811; charge station 812 is associated with an electrical couple 813; charge station 814 is associated with an electrical couple 815; and charge station 816 is associated with an electrical couple 817. Each of the electrical couples is couplable to a charge port of a battery powered vehicle, such that electrical energy can be supplied from a charge station to a battery-powered vehicle coupled to the charge station. The description of charge stations 110 in FIGS. 1, 2, 3, and 4 is fully applicable to charge stations 810, 812, 814, and 816, and is not repeated for brevity. Further, though not explicitly illustrated to reduce clutter, any of charge stations 810, 812, 814, and 816 could include or be associated with a remote device 320 as discussed with reference to FIG. 3 or an intermediate device 430 as discussed with reference to FIG. 4, such that collection, processing, and transmission of charge data can be collected by a charge station itself (as in FIG. 1), or by a device associated with a charge station (as in FIGS. 3 and 4).

FIG. 8 also shows a plurality of parking spaces 820, 822, 824, and 826. In this example four parking spaces are shown, but in other situations any appropriate number of parking spaces could be included. In the example of FIG. 8, parking space 820 is associated with charge station 810; parking space 822 is associated with charge station 812; parking space 824 is associated with charge station 814; and parking space 826 is associated with charge station 816. That is, in situation 800, there is a one-to-one relationship between charge stations and parking spaces. This is not necessarily true for all situations however; in some situations a charge station may be shared between multiple parking spaces, or in some situations multiple charge stations may be interchangeably associated with multiple parking spaces. For example, in some cases a plurality of charge stations may be clustered between multiple park spaces, such that any of the charge stations can be used by vehicles in any of the parking spaces.

FIG. 8 also shows a plurality of vehicles 830 and 832. In this example two vehicles are shown, but in other situations any appropriate number of vehicles could be included. As can be seen from FIG. 8, the number of vehicles does not need to be equal to the number of charges stations (although they can be equal in some situations).

In situation 800 of FIG. 8, vehicle 830 is positioned in parking space 822, and is electrically coupled to charge station 812 by electrical couple 813. Similarly, vehicle 832 is positioned in parking space 826, and is electrically coupled to charge station 816 by electrical couple 817. No vehicle is positioned in parking spaces 820 or 824, and no vehicle is electrically coupled to charge station 810 or charge station 814. Electrical couples 811 and 815 are stowed at charge stations 810 and 814, respectively.

As mentioned earlier, it is desirable to be able to identify what vehicle is connected to what charge station. In this regard, returning to method 700, at 702 vehicle location data is accessed by a device performing method 700 (e.g. a management device, user device, or terminal as discussed earlier). The vehicle location data indicates a respective location of each vehicle of a plurality of vehicles. Such vehicle location data can be captured or collected by telematics monitoring devices, as discussed with reference to FIG. 5. In some implementations, accessing the vehicle location data entails the vehicle location data being received by the device performing method 700 (e.g. directly from telematics monitoring devices in the vehicles, or from a device which collects the data from the plurality of vehicles). Reception of the vehicle data (and receiving of data generally as referenced throughout this disclosure) can entail the literal act of receiving the data (e.g. receiving an incoming transmission, wireless or wired), and can also entail associated acts as appropriate for a given application. Such associated acts can include processing, formatting, decompressing, or routing the data, as examples, such that the received data is in an appropriate format for use by the device performing method 700. In some implementations, accessing the vehicle location data entails the vehicle location data being made available at a server (e.g. a management device or database device), where the device performing method 700 accesses said server to retrieve the vehicle location data. In some implementations, the vehicle location data is stored at the device performing method 700 prior to method 700, and accessing the vehicle location data at 702 comprises retrieving the vehicle location data from storage.

At 704, charge station location data is accessed by the device performing method 700. The charge station location data indicates a respective location corresponding to each charge station of the plurality of charge stations. In some implementations, accessing the charge station location data comprises receiving the location data from each charge station of the plurality of charge stations. That is, each charge station can include a location sensor, and location of each charge station can be reported via a data collection system such as that described with reference to FIG. 6. Such an implementation can be advantageous if a charge station location is not fixed (e.g. mobile charge stations), or to reduce installation and setup times. In other implementations, accessing the charge station location data comprises retrieving the charge station location data from a server or database. For example, when a charge station is setup or initialized (and optionally periodically thereafter), a location sensor of the charge station may capture location data for the charge station, which is sent to the database (e.g. stored at any of the management devices in FIGS. 5 and 6), for future reference. Such an implementation advantageously reduces transmission bandwidth requirements by reducing the need for excessive location data transmissions. As another example, when a charge station is setup or initialized, an installer may use a separate location sensor to report a location associated with the charge station, for storage in the database. Such an example advantageously eliminates the need for a location sensor in the charge station, and also allows for the location associated with the charge station to be different from an actual location of the charge station itself. With reference to the example of FIG. 8, the location associated with charge station 810 can be reported as a center of parking space 820. In this way, the location associated with the charge station corresponds to a location where a vehicle would actually park to use the charge station, instead of the location of the charge station itself. In some implementations, the charge station location data is stored at the device performing method 700 prior to method 700, and accessing the charge station location data at 702 comprises retrieving the charge station location data from storage.

As mentioned earlier, the vehicle location data received at 702 indicates a respective location of each vehicle of a plurality of vehicles. In the example of FIG. 8, the vehicle location data indicates a location 831 of vehicle 830, and a location 833 of vehicle 832. As can be seen in FIG. 8, a vehicle location as indicated in vehicle location data (e.g. as captured by a location sensor such as a GPS sensor) is not always accurate. In particular, location 831 is shown as being nearly a full parking space away from vehicle 830, and location 833 is shown as being some distance from vehicle 832. As a result, determining what vehicle is coupled to what charge station solely as a function of vehicle location and charge station location can result in errors. In the example of FIG. 8, location 831 is closer to charge station 814 (which is not being used) than it is to charge station 812 (to which vehicle 830 is electrically coupled). Method 700 provides a means for addressing such issues.

At 706, first charge data is accessed by the device performing method 700. The first charge data is indicative of a respective charge start time for at least one charge event for each vehicle of the plurality of vehicles. Such first charge data can be captured or collected by telematics monitoring devices, as discussed with reference to FIGS. 2 and 5. In some implementations, accessing the first charge data in act 706 entails the first charge data being received by the device performing method 700 (e.g. directly from telematics monitoring devices in the vehicles, or from a management device which collects the data from the plurality of vehicles). Previous discussion of the meaning of reception of data is fully applicable here. In some implementations, accessing the first charge data entails the first charge data being made available at a server (e.g. a management device or database device), where the device performing method 700 accesses said server to retrieve the first charge data. In some implementations, the first charge data is stored at the device performing method 700 prior to method 700, and accessing the first charge data at 706 comprises retrieving the first charge data from storage.

At 708, second charge data is accessed by the device performing method 700. The second charge data is indicative of a respective charge start time for at least one charge event for each charge station of the plurality of charge stations. Such second charge data can be captured or collected by charge stations, remote devices, intermediate devices, and/or a data collection system as discussed with reference to FIGS. 1, 3, 4, and 6. In some implementations, accessing the second charge data in act 708 entails the second charge data being received by the device performing method 700 (e.g. directly from charge stations or associated devices, or from a management device which collects the data from the plurality of charge stations). Previous discussion of the meaning of reception of data is fully applicable here. In some implementations, accessing the second charge data entails the second charge data being made available at a server (e.g. a management device or database device), where the device performing method 700 accesses said server to retrieve the second charge data. In some implementations, the second charge data is stored at the device performing method 700 prior to method 700, and accessing the second charge data at 706 comprises retrieving the second charge data from storage.

The first charge data is representative of charge events from the perspective of a vehicle, whereas the second charge data is representative of charge events from the perspective of a charge station. By correlating the first charge data and the second charge data, pairing between vehicles and charge stations can be determined or at least approximated, especially when used in conjunction with vehicle and charge station location data. A particularly useful aspect of charge data is charge start time for charge events. Charge start time refers to a time where energy starts to be supplied by a charge station to a vehicle. In some implementations, the first charge data accessed at 706 and the second charge data accessed at 708 can directly indicate timestamps for charge start times for charge events. As a non-limiting example, a telematics monitoring device can receive voltage data and/or current data from a battery of a vehicle, which is indicative of power flow into the battery from a charge station. At least one processor of the telematics device can process the voltage data and/or current data to identify a timestamp for a start time of when power flows into the battery (a charge event start time). This charge event start time can be transmitted to a management device via a telematics system such as that discussed with reference to FIG. 5. Similarly, a sensor associated with a charge station (included in the charge station, a remote device, or an intermediate device, as discussed with reference to FIGS. 1, 3, and 4), can receive data for power being provided by the charge station. At least one processor associated with the charge station can process the data to identify a timestamp for a start time of when power flows from the charge station (a charge event start time). This charge event start time can be transmitted to a management device via data collection system such as that discussed with reference to FIG. 6.

In other implementations, the charge data can be reported in a more raw format, such as a power curve. For example, a telematics monitoring device for a vehicle can report a power curve for energy provided to a battery of the vehicle, via a telematics system such as that discussed with reference to FIG. 5. Similarly, a charge station can report a power curve for energy provided to a vehicle, via a data collection system such as that discussed with reference to FIG. 6. A management device (either collectively or respectively for the vehicle data and the charge station data) can process the energy curve data to determine a respective charge start time for the vehicle-originating data and the charge station originating data. Such processing can occur prior to method 700, such that the first charge data and the second charge data indicate charge start times directly. Alternatively, such processing can occur within method 700, such that the first charge data and the second charge data include power curve data or similar, where charge start times are determined within the context of method 700.

At 710, respective couple likelihoods are determined, for each vehicle to be electrically coupled to each charge station as respective candidate vehicle-to-charge station pairs. That is, for each possible vehicle-to-charge station pair, a couple likelihood for that pair is determined. Throughout this disclosure, a "coupled likelihood" refers to a probabilistic likelihood that a particular charge station and a particular vehicle are electrically coupled, such that the charge station can provide energy to the vehicle. In some implementations, the plurality of vehicles and the plurality of charge stations can be filtered to remove certain vehicles or charge stations which are unlikely to be coupled, as discussed later with reference to FIGS. 18, 19, and beyond.

Act 710 includes sub-acts 712, 714, and 716. At 712, respective distance-based likelihoods are determined for each candidate vehicle-to-charge station pair. Such distance-based likelihoods are based on a difference between a respective location of each vehicle as indicated in the vehicle location data and each charge station as indicated in the charge station location data. FIG. 9 illustrates a table of distance-based likelihoods for the illustrative example shown in FIG. 8. As can be seen in FIG. 9, according to difference in distance between charge stations and vehicles, vehicle 830 is most likely coupled to charge station 814 (likelihood of 0.25), and vehicle 832 is most likely coupled to charge station 816 (likelihood of 0.18). In some implementations, the distance-based likelihoods can be percentages, but this is not the case in the example of FIG. 9. In particular, the likelihood 0.25 of vehicle 830 being coupled to charge station 814 does not mean that there is a 25% chance of this coupling. Rather, the likelihood is a relative likelihood which illustrates how likely a coupling is based on likelihoods of other coupling. For example, 0.25 is 2.5 times 0.10; this means that according to the distance-based likelihoods it is 2.5 times more likely that vehicle 830 is coupled to charge station 814 than to charge station 816.

Figures 10, 11:
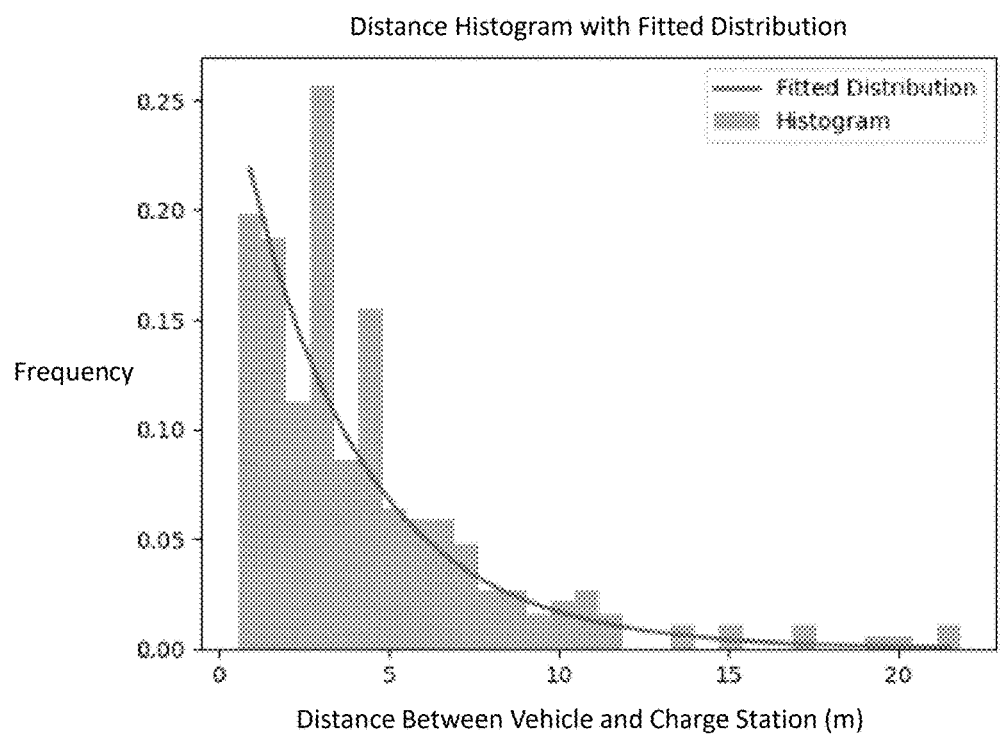
FIG. 10 is a plot showing a histogram of distances between charge stations and vehicles for known vehicle-to-charge station pairs.
FIG. 11 is a table showing exemplary timing-based likelihoods for candidate vehicle-to-charge station pairs.

To determine distance-based likelihoods, a histogram derived from known pairs can be used. In particular, respective distance-based likelihoods can be determined by, for each candidate vehicle-to-charge station pair, comparing a difference between a location of the vehicle as indicated in the vehicle location data and a location of the charge station as indicated in the charge station data to a distance histogram based on distance differences between known vehicle-to-charge station pairs. FIG. 10 illustrates an exemplary distance histogram in this regard.

To create FIG. 10, location data is collected for a set of vehicles and a set of charge stations. The state of coupling (i.e., what vehicle is electrically coupled to what charge station) is verified (e.g. by manual inspection). Thus, each vehicle to charge station pair is "known". For each known pair, a distance between the location of the vehicle (as indicated in vehicle location data from the vehicle, e.g. as reported by a telematics monitoring device in the vehicle) and a location of the coupled charge station (e.g. as manually collected, or reported by a location sensor in the charge station) is determined. These distances are plotted as a histogram. FIG. 10 shows a resulting histogram, where the y-axis indicates a frequency (occurrence in the histogram) for each determined distance in the data. Optionally, a distribution is fit to the histogram.

To determine a distance-based likelihood for a particular candidate vehicle-to-charge station pair, in sub-act 712 of method 700, a distance between a location of the vehicle (as indicated in the vehicle location data) and a location of the charge station (as indicated in the charge station location data) is determined. The determined difference is then input to the histogram (or to the optional fitted distribution), resulting in a determined distance-based likelihood (frequency in FIG. 10). For example, for the candidate vehicle-to-charge station pair of vehicle 830 and charge station 812 in FIG. 8, a difference is determined between location 831 and a location corresponding to charge station 812. In the example, this difference is approximately 2.5 meters, which corresponds to a frequency of 0.15 in the fitted distribution of FIG. 10. The other entries in the table of FIG. 9 (i.e. the remainder of the candidate vehicle-to-charge station pairs) can be populated in a similar manner.

At 714, respective timing-based likelihoods are determined for each candidate vehicle-to-charge station pair. Such timing-based likelihoods are based on a difference between a respective charge start time for a respective charge event for each vehicle as indicated in the first charge data and a respective charge start time for a respective charge event for each charge station as indicated in the second charge data. FIG. 11 illustrates a table of timing-based likelihoods for the illustrative example shown in FIG. 8. As can be seen in FIG. 11, according to difference in charge start time between charge stations and vehicles, vehicle 830 is most likely coupled to charge station 812 (likelihood of 0.012), and vehicle 832 is most likely coupled to charge station 816 (likelihood of 0.018). Similarly to as discussed above regarding FIG. 9, while the timing-based likelihoods could be determined as percentages in some implementations, this is not the case in the example of FIG. 11. Rather the timing-based likelihoods in FIG. 11 are indicated as relative likelihoods to each other.

Figures 12, 13:
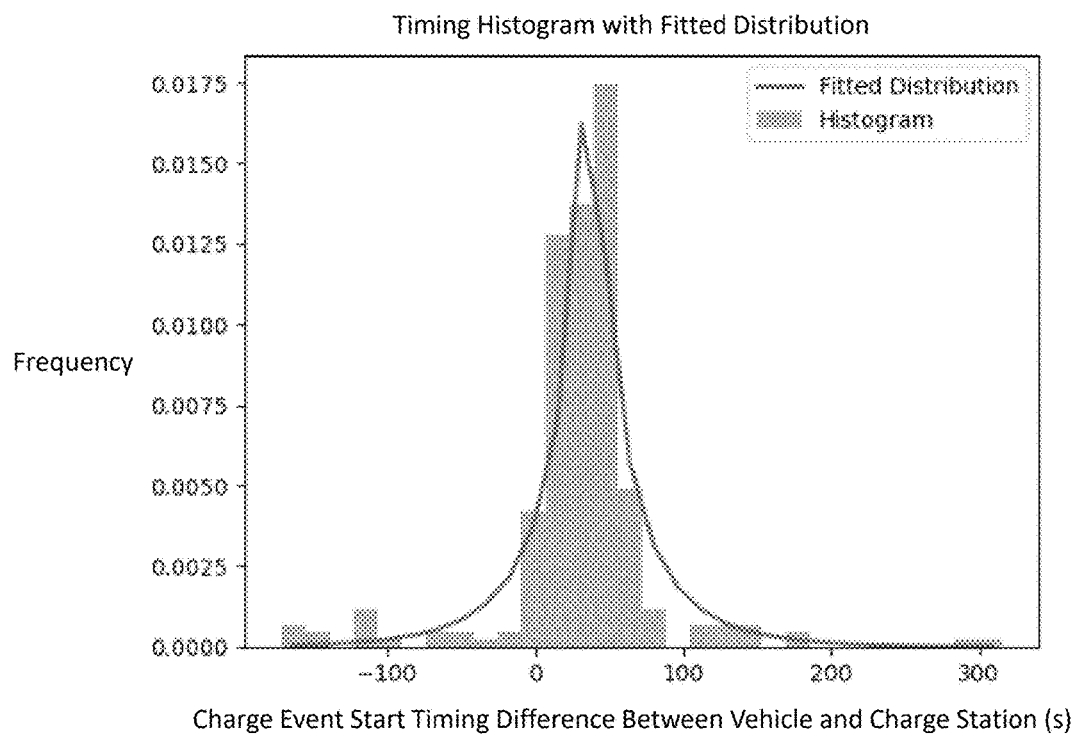
FIG. 12 is a plot showing a histogram of differences between charge event start for known vehicle-to-charge station pairs.
FIG. 13 is a table showing exemplary couple likelihoods for candidate vehicle-to-charge station pairs.

To determine timing-based likelihoods, a histogram derived from known pairs can be used, similarly to as discussed above. In particular, respective timing-based likelihoods can be determined by, for each candidate vehicle-to-charge station pair, comparing a difference between a start time of a charge event for the vehicle as indicated in the first charge data and a start time of a charge event for the charge station as indicated in the second charge data to a charge timing histogram based on charge event start time differences between known vehicle-to-charge station pairs. FIG. 12 illustrates an exemplary timing histogram in this regard.

To create FIG. 12, charge data is collected for a set of vehicles and a set of charge stations. The state of coupling (i.e., what vehicle is electrically coupled to what charge station) is verified (e.g. by manual inspection). Thus, each vehicle to charge station pair is "known". For each known pair, a difference between a start time for a charge event for the vehicle (as indicated in first charge data from the vehicle, e.g. as reported by a telematics monitoring device in the vehicle) and a start time for a charge event of the coupled charge station (e.g. as reported in second charge data from the charge station) is determined. These differences are plotted as a histogram. FIG. 12 shows a resulting histogram, where the y-axis indicates a frequency (in the histogram) for each determined difference in the data. An optional distribution can be fit to the histogram.

To determine a timing-based likelihood for a particular candidate vehicle-to-charge station pair, in sub-act 714 of method 700, a difference between a start time for a charge event of the vehicle (as indicated in the first charge data) and a start time for a charge event of the charge station (as indicated in the second charge data) is determined. If there are multiple charge events indicated in the charge data, charge events having start times which are closest to each other can be compared. The determined difference is then input to the histogram (or to the optional fitted distribution), resulting in a determined timing-based likelihood (frequency in FIG. 12). For example, for the candidate vehicle-to-charge station pair of vehicle 830 and charge station 812 in FIG. 8, a difference is determined as 25 seconds, which corresponds to a frequency of 0.012 in the fitted distribution of FIG. 12. The other entries in the table of FIG. 11 can be populated in a similar manner.

Notably, the peak of the fitted distribution in FIG. 12 (the difference between charge start timings for the vehicle and the charge station which results in the highest likelihood) is not necessarily zero (although it can be). In particular, due to a variety of factors such as delays in collecting data, and/or delays in sampling and reporting of charge data, which can vary between a vehicle (and telematics system such as in FIG. 5) and a charge station (and charge data collection system as in FIG. 6), reported charge start times may differ between vehicles and charge stations. Consequently, a non-zero charge start timing difference may represent a most likely pair in the fitted histogram. In the example of FIG. 12, the fitted distribution peaks at 31 seconds. Consequently, when using the fitted distribution of FIG. 12, a candidate vehicle-to-charge station pair will be determined as being more likely the closer the difference in charge start timing is to 31 seconds (as opposed to 0 seconds).

In the example of FIG. 11, for charge stations 810 and 814, there are no relevant charge events having start times close to the charge start times for vehicles 830 and 832, such that timing-based likelihoods for electrical coupling with charge stations 810 and 814 is practically zero. As such, the timing-based likelihoods for these charge stations is indicated as zero in FIG. 11. Further, as discussed in detail later, in some implementations the timing-based likelihoods for charge stations 810 and 814 (coupled with vehicles 830 or 832) can be set to zero when a difference between charge start times exceeds a timing threshold (e.g. 300 seconds).

As is evident from FIG. 9, relying on distance-based likelihoods alone can produce errors in determining vehicle-to-charge station pairs. In particular, the distance-based likelihood between charge station 814 and vehicle 830 is highest, despite vehicle 830 being electrically coupled to charge station 812 in the situation of FIG. 8. To address issues such as this, in sub-act 716 of method 700 the distance-based likelihood and the timing-based likelihood for each candidate vehicle-to-charge station pair are combined, as the respective couple likelihood for each candidate vehicle-to-charge station pair referenced in act 710 of method 700. An example is shown in FIG. 13.

One way to combine the distance-based likelihood and the timing-based likelihood for each candidate vehicle-to-charge station pair is to multiply the distance-based likelihood and the timing-based likelihood for each candidate vehicle-to-charge station pair. This is how the entries in FIG. 13 were determined. As can be seen in FIG. 13, the combined couple likelihoods indicate that vehicle 830 is most likely coupled to charge station 812, and vehicle 832 is most likely coupled to charge station 816. While FIG. 13 shows combined couple likelihoods based on multiplication, any appropriate mathematical manipulation or combination is possible to determine a joint likelihood based on the distance-based likelihood and the timing-based likelihood.

However, even the combined couple likelihoods as determined in act 710 may not be sufficient to provide a sufficiently accurate determination of what vehicle is coupled to what charge station. In this regard, method goes even further with act 720. At 720, a plurality of scenarios are assessed, where each scenario represents a respective set of candidate vehicle-to-charge station pairs. For each scenario, a respective overall likelihood is determined, based on an accumulation of the respective coupled likelihoods for each candidate vehicle-to-charge station pair in the scenario. Examples are illustrated in FIGS. 14 and 15.

FIG. 14 is a table showing an exhaustive list of all possible coupling scenarios for the example of FIG. 8, assuming vehicle 830 and vehicle 832 are both coupled to respective (different) charge stations. FIG. 14 also shows the overall likelihood for each scenario in the right-most column. In the example of FIG. 14, determining the respective overall likelihood for each scenario comprises multiplying the respective couple likelihoods for each candidate vehicle-to-charge station pair in the scenario. For example, to determine the overall likelihood for Scenario 1 in FIG. 14, the couple likelihood for vehicle 830 coupled to charge station 810 is multiplied by the couple likelihood for vehicle 832 coupled to charge station 812. These couple likelihoods can be found in FIG. 13 for this example. The result is shown in the right-most column of FIG. 14.

FIG. 15 is a table showing an exhaustive list of all possible coupling scenarios for the example of FIG. 8, assuming vehicle 830 and vehicle 832 are both coupled to respective (different) charge stations. FIG. 15 also shows the overall likelihood for each scenario in the right-most column. In the example of FIG. 15, determining the respective overall likelihood for each scenario comprises summing respective logarithms of the respective couple likelihoods for each candidate vehicle-to-charge station pair in the scenario, and summing the resulting logarithms. For example, to determine the overall likelihood for Scenario 1 in FIG. 14, a first logarithm is performed on the couple likelihood for vehicle 830 coupled to charge station 810, a second logarithm is perform on the couple likelihood for vehicle 832 coupled to charge station 812. These couple likelihoods can be found in FIG. 13 for this example. The first and second logarithms are then summed, as the result shown in the right-most column of FIG. 14. In the example of FIG. 14, a base 10 logarithm is used. Such an implementation can be helpful to avoid underflow (when numbers are too small for a processor or computer to handle properly). However, this calculation can also be performed in a different equivalent way, based on the identity where "Log(a)+ Log(b)=Log(a*b)". As such, the right most column of the table in FIG. 15 can also be determined by performing a logarithm of the entries in the right-most column of the table in FIG. 14.

Returning to method 700 in FIG. 7, at 722 a select scenario of the plurality of scenarios is identified, where the select scenario is the scenario which is most likely based on the respective overall likelihoods determined at 720. In the example of FIG. 14, where overall likelihoods are determined by performing a multiplication of couple likelihoods, the scenario with the highest overall likelihood result is the most likely scenario. As such, identifying the select scenario in such an example comprises identifying the select scenario as a scenario having the highest multiplied product of the respective coupled likelihoods for each candidate vehicle-to-charge station pair in the scenario. In the example of FIG. 15, where overall likelihoods are determined by performing a logarithm of a sum of couple likelihoods, the scenario with the highest overall likelihood result is the most likely scenario. As such, identifying the select scenario in such an example comprises identifying the select scenario as a scenario having the highest sum of the logarithms of the respective coupled likelihoods for each candidate vehicle-to-charge station pair in the scenario.

Figure 16:
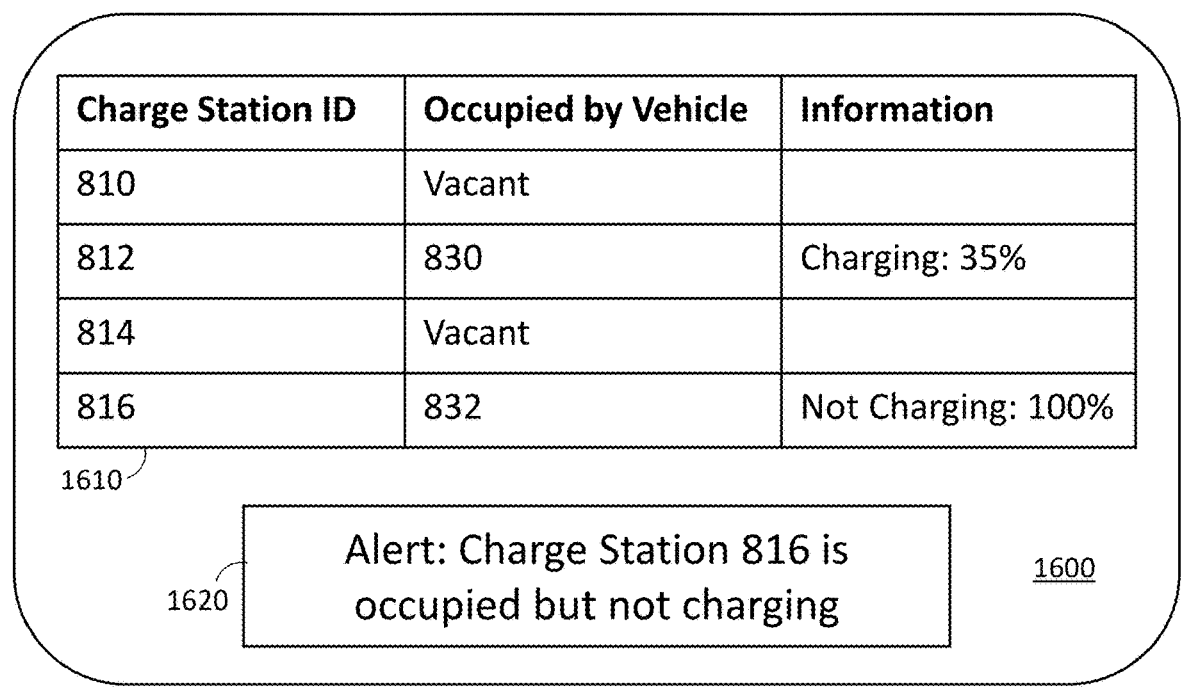
FIGS. 16 and 17 are user interface diagrams for providing indications of vehicle-to-charge stations pairs, in accordance with at least two exemplary implementations.
Figure 17:
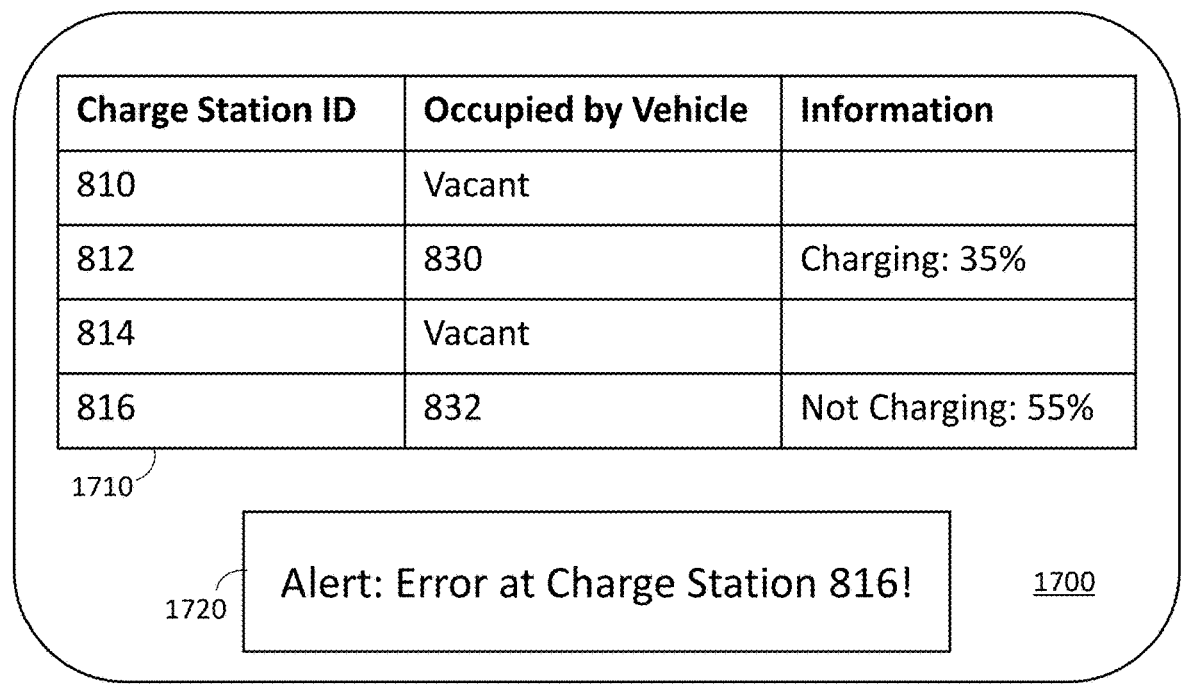

In act 724 of method 700, an indication of the select scenario is output. In some implementations, the indication of the select scenario is transmitted to another device for use or storage thereat. In other implementations, the indication of the select scenario is stored at a non-transitory processor-readable storage medium of the device performing method 700, for example for future use or for record keeping. In yet other implementations, the select scenario could be output by a user interface device of a management device or user terminal. Such a user interface can take the form of a charging dashboard, examples of which are shown in FIGS. 16 and 17 discussed below. In yet other implementations, the select scenario itself does not need to be output via a user interface, but rather the select scenario can be analyzed, and certain conclusions can be output via a user interface. For example, a user interface may comprise alert window 1610 or alert window 1710 discussed below with reference to FIGS. 16 and 17, without displaying the full status window 1610 or status window 1710 discussed below.

FIG. 16 illustrates an exemplary user interface 1600. User interface 1600 includes a status window 1610 which shows a status of each charge station of interest (e.g. each charge station owned by a particular entity, each charge station at a particular site, etc.). Status window 1610 can be populated based on the scenario identified at 722 in method 700. The left column of status window 1610 shows charge station ID numbers (which match the reference numerals for the charge stations in the example of FIG. 8 for convenience). The middle column of status window 1610 shows an occupancy status of each charge station, which shows indications of charge stations which are not electrically coupled to a vehicle (are not occupied by a vehicle: vacant), as well as what vehicle is occupying charge stations which are determined as being electrically coupled (vehicle IDs match the reference numerals in the example of FIG. 8 for convenience). Displaying available (vacant) charge stations is helpful for example to assist an operator in determining where best to park a vehicle in need of charging, especially for large depots with many charge stations.

The right most column of status window 1610 shows charging status for the vehicle electrically coupled to each charge station. For example, the charging status can include indicators such as "Charging", "Not Charging", "Trickle Charging", "Fast Charging", or any other appropriate indicators. Such indicators can be determined based on charge data from vehicles (e.g. the first charge data in method 700), and/or charge data from charge stations (e.g. the second charge data in method 700). Such charge data can be considered as "additional" charge data in the sense that it may represent charge information significantly after a charge event start time, and thus is "additional" to the context of the charge data as used in method 700. Alternatively, additional charge data which is not part of the first or second charge data can be accessed (and may be provided by either charge stations or vehicles), which can be used to populate the right most column of status window 1610. Such additional charge data can be indicative of energy supplied by each charge station of the plurality of charge stations over time.

As an example, based on the additional charge data (whether an aspect of the first charge data, the second charge data, or accessed separately), at least one vehicle-to-charge station pair can be identified where the charge station is not supplying energy. Such a situation could arise for example because a vehicle was initially electrically coupled to a charge station, and has since finished charging such that no more energy needs to be supplied to the vehicle. Alternatively, such a situation could arise for example because a vehicle was initially electrically coupled to a charge station, but the coupling has since been hampered (e.g. was bumped such that electrical coupling is no longer present or stable). Once identified, an indication of the at least one charge station can be output which indicates the at least one charge station which is not supplying energy. This is shown in FIG. 16 in the right most column of status window 1610, where an indication is presented that charge station 816 is not charging. It is also shown in an alert window 1620 of interface 1600, where an express indication is presented that charge station 816 is occupied by not charging. Based on such indications, an operator can take corrective action (e.g. moving the vehicle, or fixing a coupling situation between the vehicle and charge station).

In some implementations, battery state data can be received from the plurality of vehicles (e.g. via a telematics system such as that shown in FIG. 5). Such battery state data indicates a state of charge of the vehicle (how much charge is remaining), which can also be presented, as shown in interface 1600. In particular, the right most column of status window 1610 shows the state of charge of vehicle 830 and 832. Based on this, an operator can take appropriate action. For example, vehicle 832 is at 100% charge (finished charging), so an operator can choose to move vehicle 832 (e.g. to a dispatch area, or to make room at charge station 816 for another vehicle to charge). This is particularly advantageous when there are more vehicles to charge than charge stations. The example where a vehicle is finished charging when a battery is at 100% charge is merely exemplary. In some implementations, a battery can be considered as finished charging when it is over a charge threshold. In some cases such a charge threshold could be a safety threshold which prevent damage to the battery cause by charging to maximum. In other cases such a charge threshold can be a sufficiency threshold which represents a high enough charge level for a vehicle to complete upcoming duties with minimal to no risk of running out of energy.

FIG. 17 illustrates another user interface 1700. Interface 1700 is similar to interface 1600, and description of interface 1600 applies to interface 1700. Further, description of status window 1610 generally applies to status window 1710 unless context dictates otherwise. Further still, description of alert window 1620 applies to alert window 1720 unless context dictates otherwise. In status window 1710, the state of charge of vehicle 832 is indicated at 55%, which is indicative of some kind of error or fault which is preventing vehicle 832 from charging (since it is not fully charged). Alert window 1720 presents a more specific alert in this regard than alert window 1620. Based on this information, and operator can take action to remedy the issue which is preventing vehicle 832 from charging.

In the context of method 700 in FIG. 7, the plurality of charge stations which are considered for candidate vehicle-to-charge station pairs does not necessarily include every charge station at a given location (e.g. in a particular depot, in a particular bay of charge stations, etc.). Similarly, the plurality of vehicles which are considered for candidate vehicle-to-charge station pair does not necessarily include every vehicle of a given fleet (e.g. deployed from a common depot, owned by a common entity, etc.). Rather, preliminary filtering may be performed to exclude certain charge stations or vehicles for which electrical coupling is unlikely.

Figure 18:
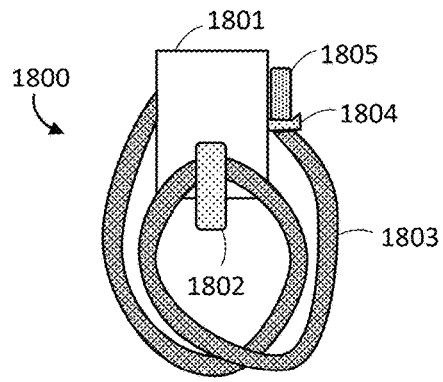
FIG. 18 is a front view of a charge station and electrical couple hardware.

In one example, some charge stations may capture couple data which indicates a state of a coupling adapter for the charge station. For example, a depression switch or electrical circuit may indicate when a coupling adapter for a charge station is connected to a vehicle, or is stowed. In this regard, FIG. 18 is a front view of a charge station 1800, having a body 1801, power cord 1803, cord holder 1802, coupling adapter 1805, and couple holder 1804. Coupling adapter 1805 is operable to connect to a charge port of a vehicle. A storage state of power cord 1803 and/or coupling adapter 1805 can be indicated by at least one sensor associated with charge station 1800. As one example, a depression switch could be included on or proximate couple holder 1804, where the state of the depression switch indicates whether coupling adapter 1805 is stored or not. A similar depression switch could be included on or proximate cord holder 1802, where the state of the depression switch indicates whether power cord 1803 is stored or not. Instead of depression switches, any appropriate detection mechanism (sensor) could be implemented, such as an electrical contact circuit. Further, detection mechanisms (sensors) do not necessarily have to directly contact the power cord 1803 or the coupling adapter 1805. As an example, cord holder 1802 could move in response to weight of power cord 1803 when stored, or couple holder 1804 could move in response to weight of coupling adapter 1805 when stored. The movement of cord holder 1802 or couple holder 1804 can activate a respective detection mechanism (sensor), which is indicative of the power cord 1803 or the coupling adapter 1805 being stored.

In some implementations, coupling adapter 1805 in FIG. 18 could have a detection mechanism (sensor) which detects when coupling adapter 1805 is connected to a vehicle. For example, coupling adapter 1805 can have a depression switch, electrical contact circuit, or any other appropriate detection mechanism to detect when coupling adapter 1805 is coupled to a vehicle. Similarly, in implementations where an intermediate device 430 (as described above with reference to FIG. 4) couples between coupling adapter 1805 and a vehicle, intermediate device 430 can have a detection mechanism (sensor) which detects when intermediate device 430 is connected to a vehicle. Such a detection mechanism can include a depression switch, electrical contact circuit, or any other appropriate detection mechanism to detect when intermediate device 430 is coupled to a vehicle.

Such couple data can be accessed by the device which performs method 700. In some implementations, charge stations for which the couple data indicates the coupling adapter is stowed can be excluded from the plurality of charge stations being considered for candidate vehicle-to-charge station pairs. In other implementations, charge stations for which the couple data indicates the coupling adapter is not connected to a vehicle can be excluded from the plurality of charge stations being considered for candidate vehicle-to-charge station pairs. With reference to the example of FIG. 8, charge station 810 and charge station 814 could be excluded from the plurality of charge stations which are being considered for vehicle-to-charge station pairs, since electrical couples 811 and 815 for these charge stations are stowed.

Figure 19:
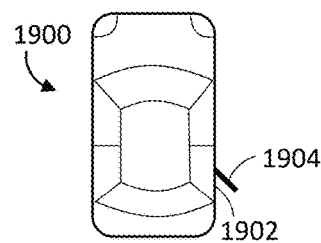
FIG. 19 is a top view of a vehicle having an open charge port cover.

In another example, some vehicles may capture data which indicates whether a charge port of the vehicle is open (and thus electrical coupling is possible). As an example, FIG. 19 is a top view of a vehicle 1900, having a charge port 1902. Charge port 1902 is connectable to a charge station (e.g. by a power cord), to receive power from the charge station and provide the received power to a battery of the vehicle (not shown to avoid clutter). Charge port 1902 is covered by a charge port cover 1904 (shown as a hinge door, but any appropriate cover construction, such as a sliding construction, could be used). A state of charge port cover 1904 can be indicated by a sensor associated with cover 1904. As one example, a depression switch could be included at or adjacent the charge port 1902, or on cover 1904. As another example, an electrical contact circuit could be included at or adjacent the charge port 1902, or on cover 1904. Whether cover 1904 is open or closed can be indicated by the state of the sensor (depression switch or electrical contact circuit in the examples). For example, closing cover 1904 could depress the switch, or complete the electrical contact circuit, providing a signal that the cover 1904 is closed. By inference, if the cover is not closed, it can be considered to be open. In another example, opening cover 1904 could depress the switch, or complete the electrical contact circuit (e.g. if the switch or electrical contacts are provided on the hinge of cover 1904, or are activated by sliding cover 1904 to the open position. In this example, a signal is provided that the cover 1904 is open, and by inference, if the cover is not open, it can be considered to be closed. Data from any sensors associated with charge port 1902 and cover 1904 can be sent from a vehicle (e.g. by a telematic monitoring device) as couple data.

Such couple data can be accessed by the device which performs method 700. In some implementations, vehicles for which the couple data indicates the charge port is closed (or is not open) can be excluded from the plurality of vehicles being considered for candidate vehicle-to-charge station pairs.

In some implementations, certain charge stations can be excluded from the plurality of charge stations being considered for candidate vehicle-to-charge station pairs based on energy supply data from an energy management system. For example, in some implementations an energy management system is implemented to curtail or optimize energy supply by a plurality of charge stations, to avoid exceed infrastructure power supply limitations. In such implementations, a charge station for which power supply is curtailed can be excluded from the plurality of charge stations.

In some implementations, certain vehicles can be excluded from the plurality of vehicles being considered for candidate vehicle-to-charge station pairs based on the vehicle location data. For example, if the vehicle is over a threshold distance away from relevant charge stations or a depot where such charge stations are located (e.g. if the vehicle is 50 meters or more away), the vehicle can be considered as not being electrically coupled to any charge station, and excluded from the plurality of vehicles being considered for candidate vehicle-to-charge station pairs.

In some implementations, certain vehicles can be excluded from the plurality of vehicles being considered for candidate vehicle-to-charge station pairs based on the first charge data. For example, if there is no charge event within a set threshold (e.g. a number of hours or days), the vehicle can be considered as not being electrically coupled to any charge station, and excluded from the plurality of vehicles being considered for candidate vehicle-to-charge station pairs.

In some implementations, certain charge stations can be excluded from the plurality of charge stations being considered for candidate vehicle-to-charge station pairs based on the second charge data. For example, if there is no charge event within a set threshold (e.g. a number of hours or days), the charge station can be considered as not being electrically coupled to any vehicle, and excluded from the plurality of charge stations being considered for candidate vehicle-to-charge station pairs.

Further, in determining couple likelihoods in act 710 of method 700, certain candidate vehicle-to-charge station pairs can be eliminated (or their couple likelihoods set to 0) based on at least one pairing threshold. Such pairing thresholds can be based on distance, and/or on charge start timing. As an example, a candidate vehicle-to-charge station pair can be eliminated (or its couple likelihood set to 0) if a distance between the location of the vehicle as indicated in the vehicle location data and a location of the charge station as indicated in the charge station location data exceeds a distance threshold (for example, 25 meters). As another example, a candidate vehicle-to-charge station pair can be eliminated (or it's couple likelihood set to 0) if the closest charge event start times as indicated in the first charge data and the second charge data exceed a start time threshold (for example, 3 minutes). The exact thresholds can be set as appropriate for a given application.

Similar logic can be applied to the plurality of scenarios. In particular, the plurality of scenarios can be "compiled" in the context of method 700, in the each reasonably possible scenario is included in the plurality of scenarios. A scenario can be determined as reasonably possible if it includes candidate vehicle-to-charge station pairs within at least one specified pairing threshold (such as the distance or timing based thresholds discussed above). Scenarios can be determined as not reasonably possible if they include candidate vehicle-to-charge station pairs outside of the at least one pairing threshold. In this regard, if a scenario includes a candidate vehicle-to-charge station pair which was previously excluded (as discussed above) or has a couple likelihood set to 0 (as discussed above), said scenario can be excluded from the plurality of scenarios.

Excluding or eliminating certain vehicles, charge stations, or vehicle-to-charge station pairs from consideration can reduce the computational burden of method 700, by reducing the numbers of scenarios which are analyzed at 720.

Figure 20:
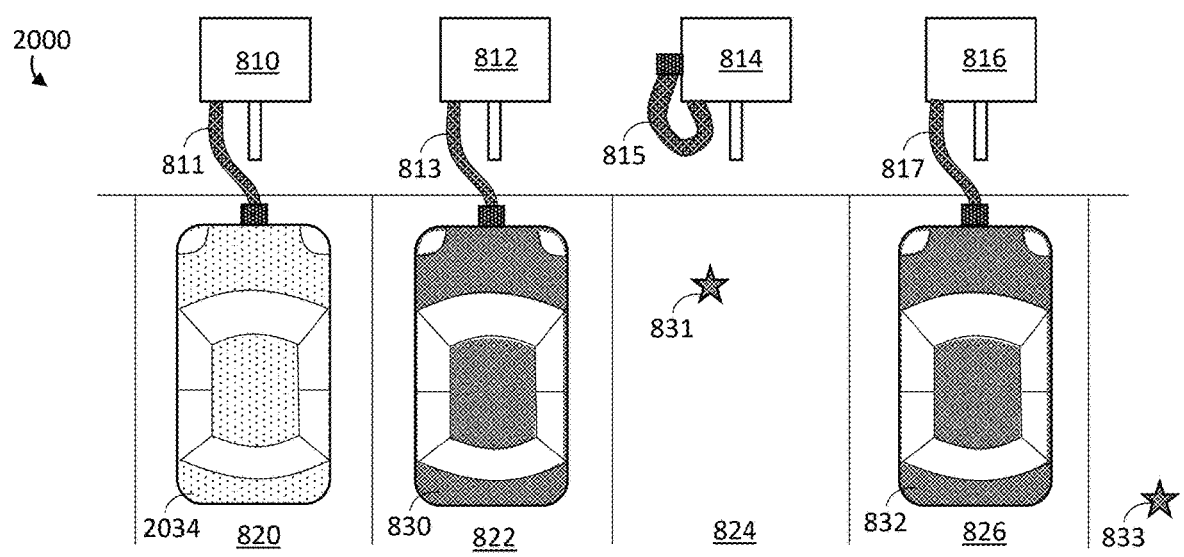
FIG. 20 is a top view of another exemplary charging situation for a plurality of charge stations and vehicles.

FIG. 20 is a top view of an exemplary situation 2000. Situation 2000 is similar to situation 800 in FIG. 8 discussed earlier, and description of situation 800 is fully applicable to situation 2000 unless context dictates otherwise. In situation 2000, an additional vehicle 2034 is positioned in parking space 820, and is electrically coupled to charge station 810. However, vehicle location data and first charge data is not available for vehicle 2034. This could be for example because vehicle 2034 is not owned or operated by the same entity which operates (or included in the same fleet as) vehicles 830 and 832. That is, vehicle 2034 can be an unknown vehicle which happens to be charging at charge station 810.

Because vehicle location data and first charge data are not available for vehicle 2034, vehicle 2034 is not included in the plurality of vehicles which are under consideration for vehicle-to-charge station pairs. Regardless, the robustness of the presented systems, devices, and methods should be sufficient to successfully identify vehicle 830 as being coupled to charge station 812, and vehicle 832 as being coupled to charge station 816, because of the effective combination of multiple forms of data. Further, second charge data is available for charge station 810, which can indicate that power is being supplied by charge station 810 even though an associated vehicle being charged cannot be identified. This can be identified and output as appropriate, for example via the interfaces presented in FIGS. 16 and 17. For example, in the middle column of status window 1610 or 1710, charge station 810 can be indicated as "Occupied by unknown vehicle". As another example, alert window 1620 or 1720 could present an alert such as "Charge station 810 is occupied by an unknown vehicle". An operator can then take corrective action, if appropriate (e.g. if the unknown vehicle is not authorized to use the charge station).

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:
1. A system for identifying electrical coupling between a plurality of vehicles and a plurality of charge stations, the system comprising:
   at least one output device;
   at least one processor;
   the plurality of charge stations;
   at least one non-transitory processor-readable storage medium communicatively coupled to the at least one processor, the at least one processor-readable storage medium storing processor-executable instructions which, when executed by the at least one processor, cause the system to:
- access vehicle location data indicating a respective location of each vehicle of the plurality of vehicles;
- access charge station location data indicating a respective location corresponding to each charge station of the plurality of charge stations;
- supply, by each charge station of the plurality of charge stations, power to a respective vehicle of the plurality of vehicles for a respective charge event of a plurality of charge events;
- access first charge data, the first charge data indicative of a respective charge start time for at least one charge event of the plurality of charge events for each vehicle in the plurality of vehicles;
- access second charge data, the second charge data indicative of a respective charge start time for at least one charge event of the plurality of charge event for each charge station in the plurality of charge stations;
- determine respective couple likelihoods for each vehicle to be electrically coupled to each charge station as respective candidate vehicle-to-charge station pairs, by:
  - determining respective distance-based likelihoods for each candidate vehicle-to-charge station pair, based on a difference between a respective location of each vehicle as indicated in the vehicle location data and each charge station as indicated in the charge station location data;
  - determining respective timing-based likelihoods for each candidate vehicle-to-charge station pair, based on a difference between a respective charge start time for a respective charge event of the plurality of charge events for each vehicle as indicated in the first charge data and a respective charge start time for a respective charge event of the plurality of charge events for each charge station as indicated in the second charge data; and
  - combining the distance-based likelihood and the timing-based likelihood for each candidate vehicle-to-charge station pair as the respective couple likelihoods for each candidate vehicle-to-charge station pair;
- for each scenario of a plurality of scenarios, each scenario representing a respective set of candidate vehicle-to-charge station pairs: determine a respective overall likelihood for the scenario, based on an accumulation of the respective couple likelihoods for each candidate vehicle-to-charge station pair in the scenario;
- identify a select scenario of the plurality of scenarios, the select scenario being the most likely scenario according to the determined respective overall likelihoods; and
- output, by the at least one output device, an indication of the select scenario.

2. The system of claim 1, wherein the processor-executable instructions which cause the system to combine the distance-based likelihood and the timing-based likelihood for each candidate vehicle-to-charge station pair cause the at least one processor to multiply the distance-based likelihood and the timing-based likelihood for each candidate vehicle-to-charge station pair.

3. The system of claim 1, wherein for each scenario, the processor-executable instructions which cause the system to determine a respective overall likelihood for the scenario cause the at least one processor to multiply the respective couple likelihoods for each candidate vehicle-to-charge station pair in the scenario.

4. The system of claim 3, wherein the processor-executable instructions which cause the system to identify a select scenario of the plurality of scenarios cause the at least one processor to identify the select scenario as a scenario having the highest multiplied product of the respective couple likelihoods for each candidate vehicle-to-charge station pair in the scenario.

5. The system of claim 1, wherein for each scenario, the processor-executable instructions which cause the system to determine a respective overall likelihood for the scenario cause the at least one processor to determine a sum of logarithms of the respective couple likelihoods for each candidate vehicle-to-charge station pair in the scenario.

6. The system of claim 5, wherein the processor-executable instructions which cause the system to identify a select scenario of the plurality of scenarios cause the at least one processor to identify the select scenario as a scenario having the highest sum of logarithms of the respective couple likelihoods for each candidate vehicle-to-charge station pair in the scenario.

7. The system of claim 1, wherein the processor-executable instructions which cause the system to determine respective distance-based likelihoods for each candidate vehicle-to-charge station pair cause the at least one processor to, for each candidate vehicle-to-charge station pair, compare a difference between a location of the vehicle as indicated in the vehicle location data and a location of the charge station as indicated in the charge station location data to a distance histogram based on distance differences between known vehicle-to-charge station pairs.

8. The system of claim 1, wherein the processor-executable instructions which cause the system to determine respective timing-based likelihoods for each candidate vehicle-to-charge station pair cause the at least one processor to, for each candidate vehicle-to-charge station pair, compare a difference between a start time of a charge event of the plurality of charge events for the vehicle as indicated in the first charge data and a start time of a charge event of the plurality of charge events for the charge station as indicated in the second charge data to a charge timing histogram based on charge event start time differences between known vehicle-to-charge station pairs.

9. The system of claim 8, wherein the charge timing histogram peaks at a non-zero charge event start time difference between known vehicle-to-charge station pairs.

10. The system of claim 1, wherein the processor-executable instructions further cause the system to compile the plurality of scenarios, by including scenarios which include vehicle-to-charge station pairs within at least one pairing threshold, and excluding scenarios which include vehicle-to-charge station pairs outside of the at least one pairing threshold.

11. The system of claim 10, wherein the at least one pairing threshold includes at least one threshold selected from a group of thresholds consisting of:
- a start time threshold for a difference in start time between a charge event for the vehicle and charge event for the charge station of a vehicle-to-charge station pair; and
- a distance threshold for a distance between the vehicle and the charge station.

12. The system of claim 1, wherein the respective location corresponding to each charge station of the plurality of charge stations indicates a location of where a vehicle is positioned when electrically coupled to the charge station.

13. The system of claim 1, wherein the processor-executable instructions further cause the system to output an indication of any charge stations which are not electrically coupled to a vehicle in the select scenario.

14. The system of claim 1, wherein the processor-executable instructions further cause the system to:
   access additional charge data, the additional charge data indicative of energy supplied by each charge station of the plurality of charge stations over time;
   identify, from the set of vehicle-to-charge station pairs in the select scenario, at least one vehicle-to-charge station pair where the charge station is not supplying energy; and
   output, by the at least one output device, an alert which includes an indication of the at least one charge station which is not supplying energy.

15. The system of claim 1, further comprising a plurality of vehicle devices, each vehicle device positioned in a respective vehicle of the plurality of vehicle devices, and each vehicle device comprising:
   a location sensor to capture a respective portion of the vehicle location data indicating a location of a vehicle in which the vehicle device is positioned; and
   a communication interface to transmit the respective portion of the location data to a management device which comprises the at least one processor and the at least one non-transitory processor-readable storage medium.

16. The system of claim 1, further comprising a plurality of vehicle devices, each vehicle device positioned in a respective vehicle of the plurality of vehicle devices, and each vehicle device comprising:
   a charge data sensor to capture a respective portion of the first charge data indicating a charge start time for a charge event of the plurality of charge events for a vehicle in which the vehicle device is positioned; and
   a communication interface to transmit the respective portion of the first charge data to a management device which comprises the at least one processor and the at least one non-transitory processor-readable storage medium.

17. The system of claim 1, wherein the processor-executable instructions which cause the system to access the charge station location data cause the system to retrieve the charge station location data from a database.

18. The system of claim 1, wherein each charge station comprises:
   a charge data sensor to capture a respective portion of the second charge data indicating a charge start time for a charge event of the plurality of charge events for the charge station; and
   a communication interface to transmit the respective portion of the first charge data to a management device which comprises the at least one processor and the at least one non-transitory processor-readable storage medium.

19. The system of claim 1, further comprising a respective at least one sensor at each charge station of a superset of charge stations, each respective at least one sensor to capture charge station couple data for the respective charge station, wherein:
   the superset of charge stations includes at least the plurality of charge stations;
   the charge station couple data indicates a state of respective coupling adapters for each charge station of a superset of charge stations; and
   the processor executable instructions further cause the system to:
      access the charge station couple data from the superset of charge stations; and
      determine, by the at least one processor, the plurality of charge stations as a set of charge stations of the superset of charge stations, excluding each charge station of the superset of charge stations where a state of a respective coupling adapter is indicative of the coupling adapter not being used.

20. The system of claim 1, further comprising a respective at least one sensor at each vehicle of a superset of vehicles, each respective at least one sensor to capture vehicle couple data for the respective vehicle, wherein:
   the superset of vehicles includes at least the plurality of vehicles;
   the vehicle couple data indicates a state of respective charge ports for each vehicle of the superset of vehicles; and
   the processor executable instructions further cause the system to:
      access the vehicle couple data; and
      determine, by the at least one processor, the plurality of vehicles as a set of vehicles of the superset of vehicles, excluding each vehicle of the superset of vehicles where a state of a respective charge port is indicative of the vehicle not being chargeable.

* * * * *